United States Patent
Gupta et al.

(10) Patent No.: US 12,217,604 B2
(45) Date of Patent: Feb. 4, 2025

(54) SYSTEM AND METHOD FOR DRIVING ASSISTANCE ALONG A PATH

(71) Applicant: SONY GROUP CORPORATION, Tokyo (JP)

(72) Inventors: Manish Gupta, Bangalore (IN); Ramesh Chelur Ramchandra Sastry, Bangalore (IN); Pramod Chintalapoodi, San Diego, CA (US); Sho Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/174,800

(22) Filed: Feb. 27, 2023

(65) Prior Publication Data
US 2023/0230477 A1 Jul. 20, 2023

Related U.S. Application Data

(63) Continuation of application No. 17/210,224, filed on Mar. 23, 2021, now Pat. No. 11,615,706, which is a
(Continued)

(51) Int. Cl.
*G08G 1/0967* (2006.01)
*B60C 9/00* (2006.01)
(Continued)

(52) U.S. Cl.
CPC .......... *G08G 1/09623* (2013.01); *B60C 9/00* (2013.01); *B60Q 9/00* (2013.01); *B60W 50/08* (2013.01);
(Continued)

(58) Field of Classification Search
CPC ......... G08G 1/09623; G08G 1/096708; G08G 1/096716; G08G 1/096741;
(Continued)

(56) References Cited

U.S. PATENT DOCUMENTS 5,396,429 A * 3/1995 Hanchett .............. G08G 1/0969
348/149
5,699,056 A 12/1997 Yoshida
(Continued)

FOREIGN PATENT DOCUMENTS

CN 102632888 A 8/2012
DE 102012022563 A1 5/2014
(Continued)

OTHER PUBLICATIONS

Office Action for JP Application No. 2018-507047 issued on Nov. 16, 2021, 04 pages of Office Action and 04 pages of Translation.
(Continued)

*Primary Examiner* — Tai T Nguyen
(74) *Attorney, Agent, or Firm* — CHIP LAW GROUP

(57) ABSTRACT

Various aspects of a system and method for driving assistance along a path are disclosed herein. In accordance with an embodiment, a unique identifier is received from a communication device at an electronic control unit (ECU) of a first vehicle. The unique identifier is received when the first vehicle has reached a first location along a first portion of the path. A communication channel is established between the first vehicle and the communication device based on the received unique identifier. Data associated with a second portion of the path is received by the ECU from the communication device based on the established communication channel. Alert information associated with the second portion of the path is generated by the ECU based on the received data.

13 Claims, 12 Drawing Sheets

Related U.S. Application Data continuation of application No. 16/739,378, filed on Jan. 10, 2020, now Pat. No. 10,984,655, which is a continuation of application No. 16/195,025, filed on Nov. 19, 2018, now Pat. No. 10,565,870, which is a continuation of application No. 15/674,693, filed on Aug. 11, 2017, now Pat. No. 10,140,861, which is a continuation of application No. 14/851,231, filed on Sep. 11, 2015, now Pat. No. 9,767,687.

(51) Int. Cl.
  *B60Q 9/00* (2006.01)
  *B60W 50/08* (2020.01)
  *B60W 50/14* (2020.01)
  *G08G 1/0962* (2006.01)
  *G08G 1/16* (2006.01)
  *G08G 1/01* (2006.01)

(52) U.S. Cl.
  CPC ....... *B60W 50/14* (2013.01); *G08G 1/096708* (2013.01); *G08G 1/096716* (2013.01); *G08G 1/096741* (2013.01); *G08G 1/096775* (2013.01); *G08G 1/096783* (2013.01); *G08G 1/096791* (2013.01); *G08G 1/163* (2013.01); *G08G 1/164* (2013.01); *B60W 2520/06* (2013.01); *B60W 2520/10* (2013.01); *B60W 2552/00* (2020.02); *B60W 2552/30* (2020.02); *B60W 2556/45* (2020.02); *G08G 1/0112* (2013.01)

(58) Field of Classification Search
  CPC ....... G08G 1/096775; G08G 1/096783; G08G 1/096791; G08G 1/163; G08G 1/164; B60C 9/00; B60Q 9/00; B60W 50/08; B60W 50/14; B60W 2520/06; B60W 2520/10; B60W 2552/00
  USPC ........................................................ 340/905
  See application file for complete search history.

(56) References Cited

U.S. PATENT DOCUMENTS

| | | | |
|---|---|---|---|
| 6,005,491 A | 12/1999 | Kopchak et al. | |
| 6,246,948 B1 | 6/2001 | Thakker | |
| 6,864,784 B1 | 3/2005 | Loeb | |
| 7,190,283 B1 | 3/2007 | Varian | |
| 7,840,341 B1 * | 11/2010 | Sato | G01C 21/343 701/425 |
| 8,988,252 B2 | 3/2015 | Scholl et al. | |
| 9,396,656 B2 | 7/2016 | Cazanas et al. | |
| 9,767,687 B2 * | 9/2017 | Gupta | B60C 9/00 |
| 2001/0020902 A1 | 9/2001 | Tamura | |
| 2005/0222760 A1 | 10/2005 | Cabral et al. | |
| 2005/0231340 A1 | 10/2005 | Tauchi | |
| 2006/0095195 A1 | 5/2006 | Nishimura et al. | |
| 2006/0208923 A1 | 9/2006 | Tauchi | |
| 2007/0282532 A1 | 12/2007 | Yamamoto et al. | |
| 2007/0294023 A1 | 12/2007 | Arcot et al. | |
| 2009/0140881 A1 | 6/2009 | Sakai et al. | |
| 2010/0157430 A1 | 6/2010 | Hotta et al. | |
| 2011/0087433 A1 * | 4/2011 | Yester | G08G 1/096716 701/469 |
| 2011/0148659 A1 | 6/2011 | Ueno et al. | |
| 2012/0025965 A1 | 2/2012 | Mochizuki et al. | |
| 2013/0113618 A1 | 5/2013 | Flanagan et al. | |
| 2013/0141576 A1 | 6/2013 | Lord et al. | |
| 2013/0231829 A1 | 9/2013 | Gerdt | |
| 2013/0325344 A1 | 12/2013 | Yester | |
| 2015/0046022 A1 | 2/2015 | Bai et al. | |
| 2016/0001777 A1 | 1/2016 | Gerdt | |
| 2016/0033257 A1 | 2/2016 | Meissner | |
| 2016/0046237 A1 | 2/2016 | Sugimoto et al. | |
| 2016/0332570 A1 | 11/2016 | Kunkel | |

FOREIGN PATENT DOCUMENTS

| | | |
|---|---|---|
| DE | 102013107738 A1 | 1/2015 |
| DE | 102013019112 A1 | 5/2015 |
| EP | 2486556 A1 | 8/2012 |
| EP | 2628062 A1 | 8/2013 |
| JP | 11-053697 A | 2/1999 |
| JP | 2001-101566 A | 4/2001 |
| JP | 2001-101599 A | 4/2001 |
| JP | 2005-215878 A | 8/2005 |
| JP | 2006193082 A | 7/2006 |
| JP | 2007-156568 A | 6/2007 |
| JP | 2007233864 A | 9/2007 |
| JP | 2007-323185 A | 12/2007 |
| JP | 2008-102690 A | 5/2008 |
| JP | 2009-069938 A | 4/2009 |
| JP | 2013-507691 A | 3/2013 |
| WO | 2011/044321 A1 | 4/2011 |
| WO | 2012/050486 A1 | 4/2012 |

OTHER PUBLICATIONS

Office Action for JP Patent Application No. 2018-507047, issued on Apr. 20, 2021, 04 pages of English Translation and 04 pages of Office Action.
Office Action for EP Patent Application No. 16763600.0, issued on Mar. 26, 2021, 05 pages.
Office Action for IN Patent Application No. 201827007682, issued on Nov. 24, 2020, 08 pages.
Non-Final Office Action for U.S. Appl. No. 16/195,025, issued on May 14, 2019, 09 pages.
Notice of Allowance for U.S. Appl. No. 16/195,025, issued on Oct. 16, 2019, 15 pages.
Non-Final Office Action for U.S. Appl. No. 15/674,693, issued on Mar. 19, 2018, 12 pages.
Notice of Allowance for U.S. Appl. No. 15/674,693, issued on Jul. 30, 2018, 07 pages.
Non-Final Office Action for U.S. Appl. No. 14/851,231, issued on Nov. 9, 2016, 09 pages.
Notice of Allowance for U.S. Appl. No. 14/851,231, issued on May 9, 2017, 07 pages.
International Search Report and Written Opinion for PCT Patent Application No. PCT/JP2016/003887, issued on Jan. 16, 2017, 11 pages of ISRWO.
International Preliminary Report on Patentability of PCT Application No. PCT/JP2016/003887, issued on Mar. 22, 2018, 09 pages of IPRP.
Non-Final Office Action for U.S. Appl. No. 16/739,378, issued on Jul. 28, 2020, 10 pages.
Notice of Allowance for U.S. Appl. No. 16/739,378, issued on Mar. 8, 2021, 2 pages.
Notice of Allowance for U.S. Appl. No. 16/739,378, issued on Dec. 23, 2020, 9 pages.
Notice of Allowance for U.S. Appl. No. 17/210,224, issued on Nov. 25, 2022, 10 pages.
Non-Final Office Action for U.S. Appl. No. 17/210,224, issued on May 25, 2022, 10 pages.

* cited by examiner

SYSTEM AND METHOD FOR DRIVING ASSISTANCE ALONG A PATH

CROSS-REFERENCE TO RELATED APPLICATIONS

The present application is a continuation application of U.S. patent application Ser. No. 17/210,224, filed Mar. 23, 2021, now U.S. Pat. No. 11,615,706, which is a continuation application of U.S. patent application Ser. No. 16/739,378, filed Jan. 10, 2020, now U.S. Pat. No. 10,984,655, which is a continuation application of U.S. patent application Ser. No. 16/195,025, filed Nov. 19, 2018, now U.S. Pat. No. 10,565,870, which is a continuation application of U.S. patent application Ser. No. 15/674,693, filed Aug. 11, 2017, now U.S. Pat. No. 10,140,861, which is a continuation application of U.S. patent application Ser. No. 14/851,231, filed Sep. 11, 2015, now U.S. Pat. No. 9,767,687, the entire contents of which is hereby incorporated by reference.

FIELD

Various embodiments of the disclosure relate to driving assistance. More specifically, various embodiments of the disclosure relate to driving assistance for a vehicle along a path.

BACKGROUND

Advanced applications, such as intelligent transportation system (ITS), have revolutionized numerous services that relate to different modes of transport and traffic management. As a result, various assistance systems, such as a driving assistance system, are rapidly evolving with respect to their technology and utility to aid in different driving scenarios.

In certain scenarios, it may be difficult for a driver of a motor vehicle to view beyond a certain point ahead in a path due to an unfavorable environmental condition or terrain. For example, paths in mountainous terrains may be narrow and may have multiple sharp and/or blind curves. In another example, at blind spots, there may be a poor visibility and the driver may need to know if there are other vehicles and/or pedestrians at the blind spots. In such scenarios, the driver may be required to brake hard when the curve suddenly appears to be sharper and/or steeper than expected. This may cause the motor vehicle to under-steer or over-steer and may result in an accident. In addition, the presence of road hazards, such as potholes and other obstacles, not visible beyond a certain point, may also pose a risk to occupant(s) of the motor vehicle. Consequently, enhanced driving assistance may be required that may anticipate such blind curves and other road hazards.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for driving assistance along a path substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
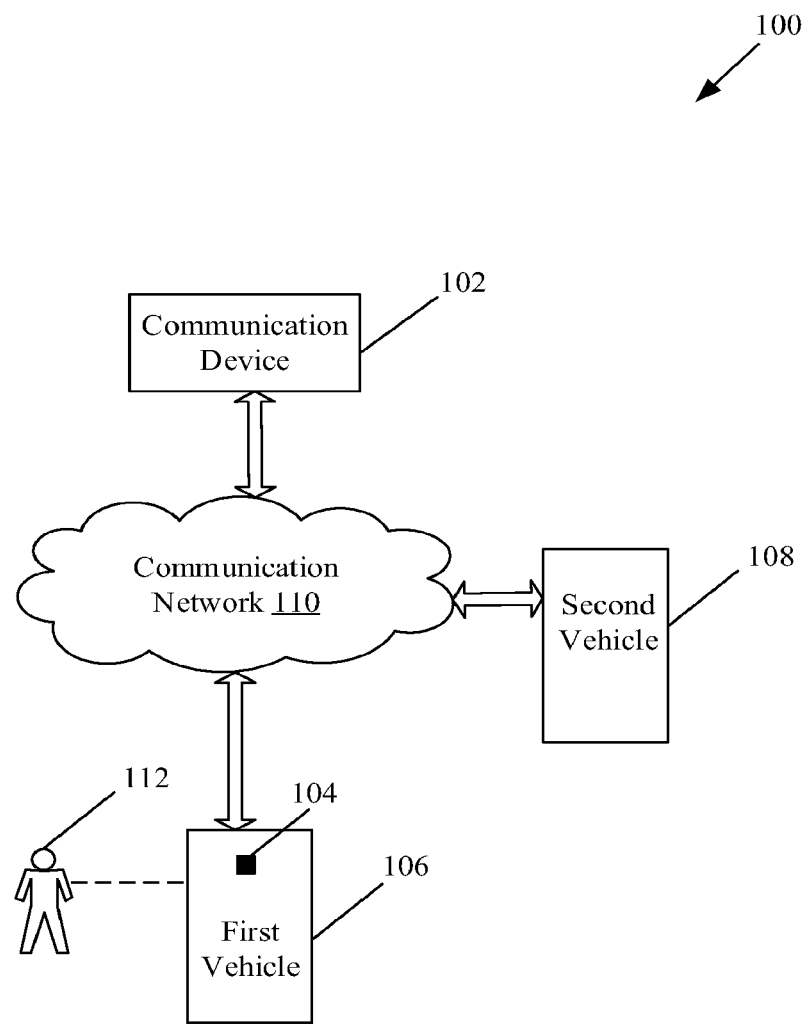
FIG. 1 is a block diagram that illustrates a network environment for driving assistance, in accordance with an embodiment of the disclosure.

The following described implementations may be found in the disclosed system and method for driving assistance along a path. Exemplary aspects of the disclosure may comprise a method that may include receipt of a unique identifier of a first vehicle from a communication device. The receipt may occur at an electronic control unit (ECU) of the first vehicle. Such receipt may occur when the first vehicle has reached a first location along a first portion of a path. A communication channel may be established between the first vehicle and the communication device. Such a communication channel may be established based on the received unique identifier. Data associated with a second portion of the path may be received from the communication device based on the established communication channel. Alert information associated with the second portion of the path may be generated based on the received data.

In accordance with an embodiment, sensor data may be communicated to the communication device. The communicated sensor data may comprise at least a direction of travel, lane information in which the first vehicle drives, a type of the first vehicle, size of the first vehicle, weight of the first vehicle, error information of a device embedded on the first vehicle, breakdown information of the first vehicle, geospatial position, steering angle, yaw rate, speed, and/or rate of change of speed of the first vehicle.

In accordance with an embodiment, the received data associated with the second portion of the path may comprise road surface characteristics of the path and/or one or more road hazards along the path. The road surface characteristics may comprise an upward slope, a downward slope, a bank angle, a curvature, a boundary, a speed limit, a road texture, a pothole, a lane marking, and/or a width of the second portion of the path. Examples of the one or more road hazards may comprise, but is not limited to, an obstacle, an animal, a landslide, and/or a second vehicle present on the second portion of the path. In accordance with an embodiment, the data associated with the second portion of the path may be received from one or more other communication devices.

In accordance with an embodiment, the alert information may be generated when a current speed of the second vehicle is higher than a pre-specified threshold speed. The alert information may be further generated when the second vehicle crosses a lane marking along the second portion of the path. The pre-specified threshold speed may be determined based on the one or more road surface characteristics of the path.

In accordance with an embodiment, the generated alert information may be updated based on the data received from the communication device. The generated alert information may correspond to a position of the second vehicle on the second portion of the path.

In accordance with an embodiment, display of a combined view of the first portion and the generated alert information associated with the second portion of the path, may be controlled. The combined view may comprise one or more features based on the data received from the communication device. The one or more features may comprise an indication (in the combined view) of the second vehicle with regard to vehicle type, size, and position along the second portion of the path. The one or more features may further comprise an indication of current speed of the second vehicle, current distance to pass the second vehicle, and/or a required change in speed of the first vehicle to pass the second portion of the path. An indication of the one or more road hazards on the second portion of the path may also be provided in the combined view.

In accordance with an embodiment, the display of the generated alert information as a graphical view may be controlled. Such a display may occur on a heads-up display (HUD), an augmented reality (AR)-HUD which displays HUD information in an augmented reality, a driver information console (DIC), a see-through display, a projection-based display, or a smart-glass display.

Another exemplary aspect of the disclosure may comprise a method for driving assistance along a path. The method may include determination of whether the first vehicle has reached (or passed) the first location along the first portion of the path at a communication device. A first unique identifier may be communicated to the first vehicle to establish a communication channel between the first vehicle and the communication device. Such communication may occur when the first vehicle has reached a first location along the first portion of the path. Data associated with the second portion of the path may be communicated to the first vehicle.

In accordance with an embodiment, the communicated data associated with the second portion of the path may comprise the road surface characteristics of the path and/or one or more road hazards along the path. A second unique identifier may be communicated to the second vehicle to establish a communication channel between the second vehicle and the communication device. Such communication of the second unique identifier may occur when the second vehicle reaches the second location along the second portion of the path. Data associated with the first portion of the path may be communicated to the second vehicle.

In accordance with an embodiment, sensor data from the first vehicle and/or the second vehicle present on the second portion of the path may be received. The received sensor data may comprise at least a direction of travel, lane information in which the first vehicle drives, a type of the first vehicle and/or the second vehicle, size of the first vehicle and/or the second vehicle, weight of the first vehicle and/or the second vehicle, error information of a device embedded on the first vehicle and/or the second vehicle, breakdown information of the first vehicle and/or the second vehicle, geospatial position, steering angle, yaw rate, speed, and/or rate of change of speed of the first vehicle and/or the second vehicle.

In accordance with an embodiment, a warning signal may be communicated to one or both of the first vehicle and/or the second vehicle. Such communication may occur when one or both of the first vehicle and/or the second vehicle are detected along an opposing traffic lane of the path. The traffic information along the path may be communicated to one or both of the first vehicle and/or the second vehicle. In accordance with an embodiment, the communication device may be the ECU of the second vehicle, a mobile unit, or a road-side unit (RSU).

In accordance with an embodiment, the first unique identifier may be communicated based on a direction of travel of the first vehicle, lane information of the first vehicle, or a vehicle type of the first vehicle. The communicated first unique identifier may expire when the first vehicle reaches the second location along the second portion of the path. The established communication channel between the first vehicle and the communication device may then be terminated. Such termination may occur based on the expiry of the validity of the first unique identifier.

FIG. 1 is a block diagram that illustrates a network environment for driving assistance, in accordance with an embodiment of the disclosure. With reference to FIG. 1, there is shown a network environment 100. The network environment 100 may include a communication device 102, an electronic control unit (ECU) 104, and one or more vehicles, such as a first vehicle 106 and a second vehicle 108. The network environment 100 may further include a communication network 110 and one or more users, such as a driver 112 of the first vehicle 106.

The first vehicle 106 may include the ECU 104. The ECU 104 may be communicatively coupled to the communication device 102 and/or the second vehicle 108, via the communication network 110. The ECU 104 may be associated with the driver 112 of the first vehicle 106. The ECU 104 further may be communicatively coupled to one or more other communication devices (not shown), via the communication network 110, by use of one or more communication protocols, known in the art.

The ECU 104 may comprise suitable logic, circuitry, interfaces, and/or code that may be operable to receive a unique identifier from the communication device 102 when the first vehicle 106 has reached (or passed) a first location along a first portion of a path. The ECU 104 may be configured to access vehicle data of the first vehicle 106 or communicate one or more control commands to other ECUs, components, or systems of the first vehicle 106. The vehicle data and the one or more control commands may be communicated via an in-vehicle network, such as a vehicle area network (VAN), and/or in-vehicle data bus, such as a controller area network (CAN) bus.

The communication device 102 may comprise suitable logic, circuitry, interfaces, and/or code that may be operable to establish a communication channel with one or more vehicles, such as the first vehicle 106 and the second vehicle 108. The communication device 102 may be pre-installed at an accident-prone area, such as at the blind curve. Examples of the communication device 102 may include, but are not limited to, a mobile unit, an infrastructure unit, such as a road side unit (RSU), an ECU of the second vehicle 108, and/or other wireless communication devices, such as a radio-frequency (RF) based communication device.

The first vehicle 106 may comprise the ECU 104 that may be configured to communicate with the communication device 102, other communication devices, and/or a cloud server (not shown). The first vehicle 106 may be configured to communicate with other vehicles, such as the second vehicle 108, in a vehicle-to-vehicle (V2V) communication.

The second vehicle 108 may be configured similar to that of the first vehicle 106. In accordance with an embodiment, the second vehicle 108 may comprise an ECU (not shown) configured similar to that of the ECU 104. In accordance with an embodiment, the second vehicle 108 may comprise a conventional ECU that may not have the functionalities and/or configurations similar to that of the ECU 104. Examples of first vehicle 106 and the second vehicle 108 may include, but are not limited to, a motor vehicle, a hybrid vehicle, and/or a vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The communication network 110 may include a medium through which the first vehicle 106 may communicate with the communication device 102, and/or one or more other vehicles, such as the second vehicle 108. Examples of the communication network 110 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be operable to connect to the communication network 110, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), and/or Bluetooth (BT) communication protocols.

In operation, the communication device 102 may be configured to determine whether the first vehicle 106 has reached (or passed) a first location along a first portion of a path. In accordance with an embodiment, another communication device (not shown) may be configured to determine whether the first vehicle 106 has reached (or passed) the first location. A second portion of the path may be beyond a field-of-view of the driver 112 from the first location. The second portion of the path may not be visible from the first location due to terrain features, such as a blind curve in a mountainous terrain, and/or a dead angle due to an uphill road. In accordance with an embodiment, the second portion of the path may not be visible due to an unfavorable environmental and/or lighting condition, such as fog, heavy rainfall, and/or darkness. In accordance with an embodiment, the second portion of the path may not be visible from the first location or have reduced visibility due to mirage conditions, such as an inferior mirage, a superior mirage, a highway mirage, a heat haze, a 'Fata Morgana' in desert areas, and/or night-time mirages.

The communication device 102 may be configured to communicate a first unique identifier to the first vehicle 106. Such communication may occur when the first vehicle 106 reaches (or passes) the first location along the first portion of the path. In accordance with an embodiment, the first unique identifier may be communicated by another communication device situated at the first location.

In accordance with an embodiment, the ECU 104 may be configured to receive the first unique identifier from the communication device 102 and/or one or more other communication devices. Such receipt may occur when the first vehicle 106 has reached (or passed) the first location along the first portion of the path. The ECU 104 may be configured to establish a communication channel between the first vehicle 106 and the communication device 102, based on the received unique identifier.

In accordance with an embodiment, the communication device 102 may be configured to determine whether the second vehicle 108 has reached (or passed) a second location along the second portion of the path. The communication device 102 may be configured to communicate a second unique identifier to the second vehicle 108. The second unique identifier may establish a communication channel between the second vehicle 108 and the communication device 102. Such a communication of the second unique identifier may occur when the second vehicle 108 reaches (or passes) the second location along the second portion of the path.

In accordance with an embodiment, the ECU 104 may be configured to communicate sensor data associated with the first vehicle 106 to the communication device 102. The communication device 102 may be configured to receive the sensor data, communicated by the ECU 104. The sensor data, received by the communication device 102, may comprise a direction of travel, lane information in which a vehicle (such as the first vehicle and/or the second vehicle) drives, vehicle type, vehicle size, weight of a vehicle, error information of a device embedded on the vehicle, breakdown information of the vehicle, geospatial position, steering angle, yaw rate, speed, and/or rate of change of speed of the first vehicle and/or the second vehicle. As for the vehicle type, it may be a model number or a brand name set by a car manufacturer, a category based on vehicle size, such as a truck, a compact car, a Sport Utility Vehicle (SUV), characteristics of a vehicle, such as an electric vehicle (EV), an internal combustion engine (ICE) vehicle, an autonomous vehicle that may be capable to sense its environment and navigate without a driver manual operation, a vehicle operated by a human driver, a vehicle with advanced driving assisted system, a semi-autonomous vehicle, a vehicle capable of vehicle to vehicle communication, a vehicle incapable of vehicle to vehicle communication, a taxi, or a rental car. In instances when the second vehicle 108 is detected on the second portion of the path, the communication device 102 may be further configured to receive sensor data communicated by another ECU associated with the second vehicle 108.

In accordance with an embodiment, the communication device 102 may be configured to communicate data associated with the second portion of the path to the first vehicle 106. The ECU 104 may be configured to receive data associated with the second portion of the path from the communication device 102. In accordance with an embodiment, the ECU 104 may be configured to receive the data associated with the second portion of the path from the one or more other communication devices. In accordance with an embodiment, the received data associated with the second portion of the path may comprise road surface characteristics of the path and/or one or more road hazards along the path.

In accordance with an embodiment, the ECU 104 may be configured to generate alert information associated with the second portion of the path, based on the received data. In accordance with an embodiment, the ECU 104 may be configured to generate the alert information when a current speed of the second vehicle 108 is higher than a pre-specified threshold speed.

In accordance with an embodiment, the ECU 104 may be configured to generate the alert information when the second vehicle 108 crosses a lane marking along the second portion of the path. The ECU 104 may be configured to determine the pre-specified threshold speed based on the one or more road surface characteristics of the path.

In accordance with an embodiment, the ECU 104 may be configured to update the generated alert information that corresponds to a position of the second vehicle 108 on the second portion of the path. Such an update at the first vehicle 106 may occur based on the data received from the communication device 102.

In accordance with an embodiment, the ECU 104 may be configured to control the display of a combined view of the first portion and the generated alert information associated with the second portion of the path. The combined view may comprise one or more features based on the data received from the communication device 102. The one or more features may comprise an indication of the type, size, and position along the second portion of the path of the second vehicle 108. The one or more features may further comprise an indication of current speed of the second vehicle 108 and/or an indication of current distance to pass the second vehicle 108. The combined view may also comprise an indication of a required change in speed of the first vehicle 106 to pass the second portion of the path and/or an indication of one or more road hazards on the second portion of the path.

In accordance with an embodiment, the ECU 104 may be configured to control the display of the generated alert information as a graphical view. Such a display may occur on the display 210, such as a HUD, an AR-HUD, a DIC, the see-through display, a projection-based display, or a smart-glass display.

In accordance with an embodiment, the communication device 102 may be configured to communicate data associated with the first portion of the path to the second vehicle 108. The communication device 102 may be configured to communicate a warning signal to one or both of the first vehicle 106 and/or the second vehicle 108. Such a communication of the warning signal may occur when one or both of the first vehicle 106 and/or the second vehicle 108 are detected approaching each other along a same traffic lane of the path.

In accordance with an embodiment, the communication device 102 may be configured to communicate traffic information along the path to one or both of the first vehicle 106 and/or the second vehicle 108. Such traffic information may be communicated when both of the first vehicle 106 and the second vehicle 108 are detected approaching each other along a same lane of the path.

In accordance with an embodiment, the communication device 102 may be configured to terminate the established communication channel between the first vehicle 106 and the communication device 102. The established communication channel may be terminated based on expiry of the validity of the first unique identifier. The validity of the communicated first unique identifier may expire when the first vehicle 106 reaches (or passes) the second location along the second portion of the path.

Similarly, the communication device 102 may be configured to terminate the established communication channel between the second vehicle 108 and the communication device 102, based on expiry of the second unique identifier. The communicated second unique identifier may expire when the second vehicle 108 reaches (or passes) the first location along the first portion of the path.

Figure 2:
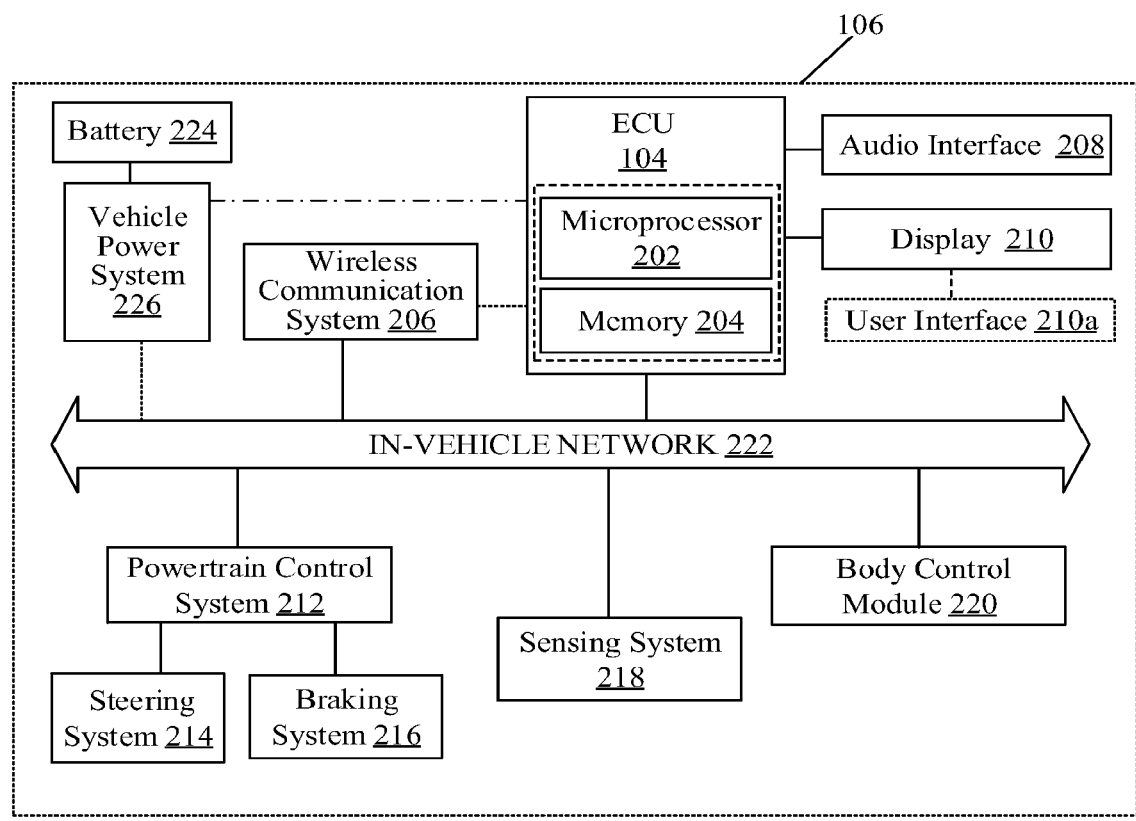
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the first vehicle 106. The first vehicle 106 may comprise the ECU 104 that may include a microprocessor 202 and a memory 204. The first vehicle 106 may further comprise a wireless communication system 206, an audio interface 208, a display 210, a powertrain control system 212, a steering system 214, a braking system 216, a sensing system 218, a body control module 220, and an in-vehicle network 222. The display 210 may render a user interface (UI) 210a. There is further shown a battery 224 associated with a vehicle power system 226. In accordance with an embodiment, the wireless communication system 206, the audio interface 208 and the display 210 may also be associated with the ECU 104.

The various components or systems may be communicatively coupled to each other, via the in-vehicle network 222, such as a vehicle area network (VAN), and/or an in-vehicle data bus. The microprocessor 202 may be communicatively coupled to the memory 204, the wireless communication system 206, the audio interface 208, the display 210, the powertrain control system 212, the sensing system 218, and the body control module 220, via the in-vehicle network 222. It should be understood that the first vehicle 106 may also include other suitable components or systems, but for brevity, those components or systems which are used to describe and explain the function and operation of the present disclosure are illustrated herein.

The microprocessor 202 may comprise suitable logic, circuitry, interfaces, and/or code that may be configured to execute a set of instructions stored in the memory 204. The microprocessor 202 may be configured to receive data associated with the second portion of the path from the communication device 102, via the wireless communication system 206. The microprocessor 202 may be configured to generate alert information associated with the second portion of the path based on the received data. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may be further operable to store one or more text-to-speech conversion algorithms, one or more speech-generation algorithms, audio data that corresponds to various buzzer sounds, and/or other data. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The wireless communication system 206 may comprise suitable logic, circuitry, interfaces, and/or code that may be configured to communicate with one or more external devices, such as the communication device 102, one or more cloud servers, and/or one or more vehicles, such as the second vehicle 108. Such communication with the one or more external devices may occur by use of the communication network 110. The wireless communication system 206 may include, but is not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card. The wireless communication system 206 may communicate via wireless communication, such as a dedicated short-range communication (DSRC) protocol, by use the communication network 110 (as described in FIG. 1).

The audio interface 208 may be connected to a speaker, a chime, a buzzer, or other device that may be operable to generate a sound. The audio interface 208 may also be connected to a microphone or other device to receive a voice input from an occupant of the first vehicle 106, such as the driver 112. The audio interface 208 may also be communicatively coupled to the microprocessor 202. The audio interface 208 may be a part of an in-vehicle infotainment (IVI) system or head unit of the first vehicle 106.

The display 210 may refer to a display screen to display various types of information to the occupants of the first vehicle 106, such as the driver 112. In accordance with an embodiment, the display 210 may be a touch screen display that may receive an input from the driver 112. The display 210 may be communicatively coupled to the microprocessor 202. Examples of the display 210 may include, but are not limited to a heads-up display (HUD) or a head-up display with an augmented reality system (AR-HUD), a driver information console (DIC), a projection-based display, a display of the head unit, a see-through display, a smart-glass display, and/or an electro-chromic display. The AR-HUD may be a combiner-based AR-HUD. The display 210 may be a transparent or a semi-transparent display. In accordance with an embodiment, the see-through display and/or the projection-based display may generate an optical illusion that the generated alert information is floating in air at a pre-determined distance from a user's eye, such as the driver 112. The first vehicle 106 may include other input/output (I/O) devices that may be configured to communicate with the microprocessor 202.

The UI 210a may be used to render the generated alert information as a graphical view on the display 210, under the control of the microprocessor 202. The display 210 may render a two-dimensional (2D) or a three-dimensional (3D) graphical view of the generated alert information, via the UI 210a, under the control of the microprocessor 202. Examples of the UI 210a is shown in FIGS. 4C, 4D, 4F, 4G, and 4H.

The powertrain control system 212 may refer to an onboard computer of the first vehicle 106 that controls operations of an engine and a transmission system of the first vehicle 106. The powertrain control system 212 may control an ignition, fuel injection, emission systems, and/or operations of a transmission system (when provided) and the braking system 216.

The steering system 214 may be associated with the powertrain control system 212. The steering system 214 may include a steering wheel and/or an electric motor (provided for a power-assisted steering) that may be used by the driver 112 to control movement of the first vehicle 106 in manual mode or a semi-autonomous mode. In accordance with an embodiment, the movement or steering of the first vehicle 106 may be automatically controlled when the first vehicle 106 is in autonomous mode. Examples of the steering system 214 may include, but are not limited to, an autonomous steering control, a power-assisted steering system, a vacuum/hydraulic-based steering system, an electro-hydraulic power-assisted system (EHPAS), or a "steer-by-wire" system, known in the art.

The braking system 216 may be used to stop or slow down the first vehicle 106 by application of frictional forces. The braking system 216 may be configured to receive a command from the powertrain control system 212 under the control of the microprocessor 202, when the first vehicle 106 is in an autonomous mode or a semi-autonomous mode. In accordance with an embodiment, the braking system 216 may be configured to receive a command from the body control module 220 and/or the microprocessor 202 when the microprocessor 202 preemptively detects a steep curvature, an obstacle, or other road hazards along the second portion of the path based on the received sensor data from the communication device 102.

The sensing system 218 may comprise one or more other vehicle sensors embedded in the first vehicle 106. The sensing system 218 may further comprise one or more image sensors to capture a field-of-view (FOV) in front of the first vehicle 106. The sensing system 218 may be operatively connected to the microprocessor 202 to provide input signals. One or more communication interfaces, such as a CAN interface, may be provided in the sensing system 218 to connect to the in-vehicle network 222. Examples of the sensing system 218 may include, but are not limited to, a vehicle speed sensor, the odometric sensors, a yaw rate sensor, a speedometer, a global positioning system (GPS), a steering angle detection sensor, a vehicle travel direction detection sensor, a magnometer, an image sensor, a touch sensor, an infrared sensor, a radio wave-based object detection sensor, and/or a laser-based object detection sensor. The one or more vehicle sensors of the sensing system 218 may be configured to detect a direction of travel, geospatial position, steering angle, yaw rate, speed, and/or rate-of-change of speed of the first vehicle 106.

The body control module 220 may refer to another electronic control unit that comprises suitable logic, circuitry, interfaces, and/or code that may be configured to control various electronic components or systems of the first vehicle 106, such as a central door locking system. The body control module 220 may be configured to receive a command from the microprocessor 202 to unlock a vehicle door of the first vehicle 106. The body control module 220 may relay the command to other suitable vehicle systems or components, such as the central door locking system, for access control of the first vehicle 106.

The in-vehicle network 222 may include a medium through which the various control units, components, or systems of the first vehicle 106, such as the ECU 104, the wireless communication system 206, the powertrain control system 212, the sensing system 218, and/or the body control module 220, may communicate with each other. In accordance with an embodiment, in-vehicle communication of audio/video data for multimedia components may occur by use of Media Oriented Systems Transport (MOST) multimedia network protocol of the in-vehicle network 222. The in-vehicle network 222 may facilitate access control and/or communication between the ECU 104 and other ECUs, such as the wireless communication system 206, of the first vehicle 106. Various devices in the first vehicle 106 may be configured to connect to the in-vehicle network 222, in accordance with various wired and wireless communication protocols. One or more communication interfaces, such as the CAN interface, a Local Interconnect Network (LIN) interface, may be used by the various components or systems of the first vehicle 106 to connect to the in-vehicle network 222. Examples of the wired and wireless communication protocols for the in-vehicle network 222 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The battery 224 may be a source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system components, such as radio, speakers, electronic navigation system, electrically controlled, powered and/or assisted steering, such as the steering system 214. The battery 224 may be a rechargeable battery. The battery 224 may be a source of electrical power to the ECU 104 (shown by dashed lines), the one or more sensors of the sensing system 218, and/or one or hardware units, such as the display 210, of the in-vehicle infotainment system. The battery 224 may be a source of electrical power to start an engine of the first vehicle 106 by selectively providing electric power to an ignition system (not shown) of the first vehicle 106.

The vehicle power system 226 may regulate the charging and the power output of the battery to various electric circuits and the loads of the first vehicle 106, as described above. When the first vehicle 106 is a hybrid vehicle or an autonomous vehicle, the vehicle power system 226 may provide the required voltage for all of the components and enable the first vehicle 106 to utilize the battery 224 power for a sufficient amount of time. In accordance with an embodiment, the vehicle power system 226 may correspond to power electronics, and may include a microcontroller that may be communicatively coupled (shown by dotted lines) to the in-vehicle network 222. In such an embodiment, the microcontroller may receive command from the powertrain control system 212 under the control of the microprocessor 202.

In operation, the microprocessor 202 may be configured to receive the first unique identifier when the first vehicle 106 reaches (or passes) the first location along the first portion of the path. The unique identifier may be received from the communication device 102, via the wireless communication system 206. In accordance with an embodiment, the unique identifier may be received from another communication device, such as a radio frequency identification (RFID) device, situated at the first location.

In accordance with an embodiment, the microprocessor 202 may be configured to establish a communication channel between the first vehicle 106 and the communication device 102. Such communication may occur based on the unique identifier received via the wireless communication system 206.

In accordance with an embodiment, the microprocessor 202 may be configured to communicate sensor data associated with the first vehicle 106 to the communication device 102, via the wireless communication system 206. The sensor data may correspond to signals received by the microprocessor 202 from the sensing system 218, such as the RADAR and/or the image-capturing unit, installed at the front side of a vehicle body of the first vehicle 106. The communicated sensor data may comprise a direction of travel, lane information in which lane the first vehicle 106 drives, vehicle type, vehicle size, weight of a vehicle, error information of a device embedded on the first vehicle 106, geospatial position, steering angle, yaw rate, speed, and/or rate of change of speed of the first vehicle 106. In instances when there is a breakdown in the first vehicle 106, the communicated sensor data may also comprise breakdown information of the first vehicle 106. The vehicle type may correspond to certain information, such as a model number or a brand name set by a car manufacturer. The vehicle type may further correspond to a category based on vehicle size, such as a truck, a compact car, a Sport Utility Vehicle (SUV). The vehicle type may further correspond to characteristics of a vehicle, such as an electric vehicle (EV), an internal combustion engine (ICE) vehicle, an autonomous vehicle that may be capable to sense its environment and navigate without a driver manual operation, a vehicle operated by a human driver, a vehicle with advanced driving assisted system, a semi-autonomous vehicle, a vehicle capable of vehicle to vehicle communication, a vehicle incapable of vehicle to vehicle communication, a taxi, or a rental car.

In accordance with an embodiment, the microprocessor 202 may be configured to receive data associated with the second portion of the path from the communication device 102, via the wireless communication system 206. In accordance with an embodiment, the microprocessor 202 may be configured to receive data associated with the second portion of the path from one or more other communication devices. The received data associated with the second portion of the path may comprise road surface characteristics of the path and one or more road hazards along the path.

In accordance with an embodiment, the microprocessor 202 may be configured to generate alert information associated with the second portion of the path, based on the received data. In accordance with an embodiment, the microprocessor 202 may be configured to generate the alert information when a current speed of the second vehicle 108 is higher than a pre-specified threshold speed. In accordance with an embodiment, the microprocessor 202 may be configured to generate the alert information when a current speed of the first vehicle 106 is higher than a pre-specified threshold speed.

In accordance with an embodiment, the microprocessor 202 (in first vehicle 106) may be configured to generate the alert information when the second vehicle 108 crosses a lane marking along the second portion of the path. The microprocessor 202 may be configured to determine the pre-specified threshold speed based on the one or more road surface characteristics of the path. In accordance with an embodiment, the microprocessor 202 may be configured to generate alert information when both the first vehicle 106 and the second vehicle 108 are detected approaching each other along a same lane of the path. Such alert information may be generated when the first vehicle 106 crosses a lane marking along the first portion of the path. The alert information may be shown on the display 210 via the UI 210a together with a buzzer sound. The microprocessor 202 may be configured to reproduce the audio data stored in the memory 204 to generate various buzzer sounds via the audio interface 208. The pitch of the buzzer sound may be controlled based on the type of safety alert.

In accordance with an embodiment, microprocessor 202 may be configured to communicate the generated alert information, such as wrong lane warning alert, directly to the second vehicle 108, via the communication network 110, such as the DSRC channel. The microprocessor 202 may be configured to update the generated alert information that corresponds to a position of the second vehicle 108 on the second portion of the path. Such an update at the first vehicle 106 may occur based on the data received from the communication device 102.

In accordance with an embodiment, the microprocessor 202 may be configured to dynamically update the generated alert information based one or more road hazards detected on the second portion of the path. Such dynamic update of the generated alert information may be further based on a change of the one or more road surface characteristics along the path. Conventionally, map data (2D/3D map data) or geospatial information pre-stored in a database, such as GPS information, may not be up-to-date, and/or may comprise only limited information. Therefore, dependency on such map data may pose a serious risk in an unfavorable environmental condition and/or terrain. The generated alert information and update of such generated alert information may ensure safety of occupant(s), such as the driver 112, of the first vehicle 106. Such an update at the first vehicle 106 and/or the second vehicle 108 may occur based on an update received from the communication device 102.

In accordance with an embodiment, the microprocessor 202 may be configured to control the display of a combined view of the first portion and the generated alert information associated with the second portion of the path, via the UI 210a. The combined view comprises one or more features based on the received data from the communication device 102. The one or more features may comprise information with regard to the second vehicle 108, such as vehicle type, size, and position along the second portion of the path. The one or more features may further comprise an indication of current speed of the second vehicle 108 and/or current distance to pass the second vehicle 108. In accordance with an embodiment, the combined view may further comprise an indication of a required change in speed of the first vehicle 106 to pass the second portion of the path and/or one or more road hazards on the second portion of the path.

In accordance with an embodiment, the microprocessor 202 may be configured to control the display of the generated alert information as a graphical view on the display 210, via the UI 210a (the generated alert information is shown in FIGS. 4C, 4D, 4F, 4G, and 4H). In accordance with an embodiment, the microprocessor 202 may be configured to continuously update the position of the second vehicle 108 on the generated graphical view of the second portion of the path.

In accordance with an embodiment, the microprocessor 202 may be configured to control display of the combined view, such that the first portion and the generated second portion of the path may be rendered as a continuous road stretch on the display 210, via the UI 210a. In accordance with an embodiment, the microprocessor 202 may be configured to control display of the combined view, such that the generated alert information that includes the second portion may be overlaid on a part of the first portion. Such an overlaid view may include the one or more features that may be updated based on the data received from the communication device 102. In accordance with an embodiment, the microprocessor 202 may be configured to automatically control one or more components or systems, such as the powertrain control system 212, the steering system 214, the braking system 216, the sensing system 218, and/or the body control module 220 of the first vehicle 106, when the first vehicle 106 is in an autonomous operating mode. Such auto control may be based on the generated alert information to pass the second portion of the path and/or one or more road hazards on the second portion of the path.

Figure 3:
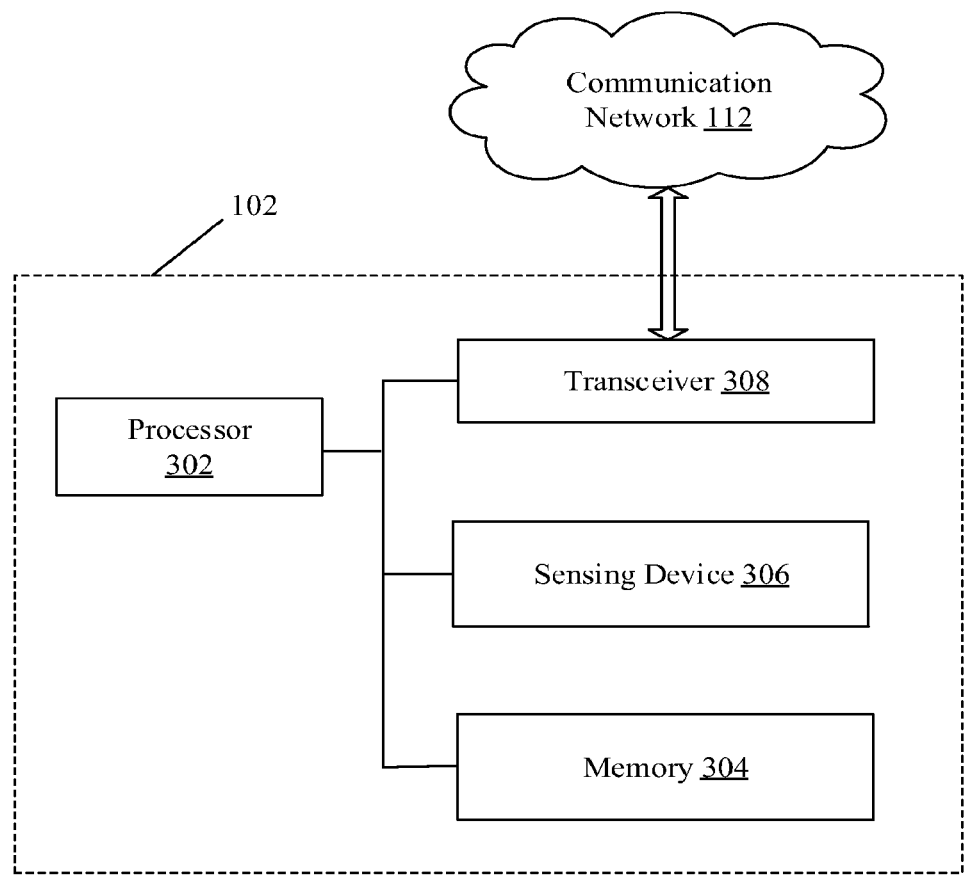
FIG. 3 is a block diagram that illustrates an exemplary communication device, in accordance with an embodiment of the disclosure.

FIG. 3 is a block diagram that illustrates an exemplary communication device, in accordance with an embodiment of the disclosure. FIG. 3 is explained in conjunction with elements from FIG. 1 and FIG. 2. With reference to FIG. 3, there is shown the communication device 102. The communication device 102 may comprise one or more processors, such as a processor 302, a memory 304, a sensing device 306, and a transceiver 308.

In accordance with an embodiment, the processor 302 may be connected to the memory 304, the sensing device 306, and the transceiver 308. The transceiver 308 may be operable to communicate with one or more vehicles, such as a first vehicle 106 and the second vehicle 108. The transceiver 308 may be further operable to communicate with the one or more other communication devices, and/or other cloud servers, via the communication network 110.

The processor 302 may comprise suitable logic, circuitry, interfaces, and/or code that may be operable to execute a set of instructions stored in the memory 304. The processor 302 may be implemented, based on a number of processor technologies known in the art. Examples of the processor 302 may be an X86-based processor, a RISC processor, an ASIC processor, a CISC processor, a CPU, a microcontroller, and/or other processors or circuits.

The memory 304 may comprise suitable logic, circuitry, and/or interfaces that may be operable to store a machine code and/or a set of instructions with at least one code section executable by the processor 302. In an embodiment, the memory 304 may be configured to pre-store road surface characteristics data associated with the first portion and second portion of the path. Examples of implementation of the memory 304 may include, but are not limited to, Random Access Memory (RAM), Read Only Memory (ROM), Hard Disk Drive (HDD), Flash memory, and/or a Secure Digital (SD) card.

The sensing device 306 may comprise suitable logic, circuitry, and/or interfaces that may be configured to store a machine code and/or instructions executable by the processor 302. The sensing device 306 may include one or more sensors for detection of a direction of travel, a geospatial position, speed, and/or rate of change of speed of vehicles, such as the second vehicle 108. The sensing device 306 may further comprise one or more image sensors to capture an FOV of the first portion and/or the second portion of the path. Other examples of the one or more sensors may include, but are not limited to, a RADAR speed gun, a LIDAR speed gun, a vehicle speed sensor, a speedometer, a global positioning system (GPS) sensor, an image sensor, an infrared sensor, a radio wave-based object detection sensor, and/or a laser-based object detection sensor.

The transceiver 308 may comprise suitable logic, circuitry, interfaces, and/or code that may be configured to communicate with one or more vehicles, such as the first vehicle 106 and/or the second vehicle 108. The transceiver 308 may be further configured to communicate with the one or more other communication devices, via the communication network 110. The transceiver 308 may be operable to communicate data to the first vehicle 106 and/or the second vehicle 108. The transceiver 308 may implement known technologies to support wired or wireless communication of the communication device 102 with the communication network 110. The transceiver 308 may include, but is not limited to, an antenna, a RF transceiver, one or more amplifiers, one or more oscillators, a digital signal processor, and/or a coder-decoder (CODEC) chipset. The transceiver 308 may communicate via wireless communication with networks and by use of one or more communication protocols similar to that described above for the wireless communication system 206.

In operation, the processor 302 may be configured to determine whether the first vehicle 106 has reached (or passed) a first location along a first portion of a path. In accordance with an embodiment, instead of the processor 302, another communication device, such as the RFID device, situated at the first location may determine whether the first vehicle 106 has reached (or passed) the first location along the first portion of a path.

In accordance with an embodiment, the processor 302 may be configured to communicate a first unique identifier to the first vehicle 106 when the first vehicle 106 reaches (or passes) the first location along the first portion of the path. In accordance with an embodiment, the processor 302 may be configured to communicate the first unique identifier based one or more of a direction of travel, lane information, and/or vehicle type of the first vehicle 106.

In accordance with an embodiment, another communication device situated at the first location may determine whether the first vehicle 106 has reached (or passed) the first location along the first portion of the path. In instances when the other communication device determines whether the first vehicle 106 has reached (or passed) the first location along the first portion, the other communication device may assign the first unique identifier to the first vehicle 106. In such instances, the first vehicle 106, or the communication device situated at the first location, may communicate the first unique identifier to the communication device 102.

In accordance with an embodiment, the processor 302 may be configured to establish a communication channel with the first vehicle 106, via the transceiver 308. Such establishment of a communication channel may occur based on the first unique identifier dynamically assigned to the first vehicle 106.

In accordance with an embodiment, the processor 302 may be configured to determine whether the second vehicle 108 has reached (or passed) the second location along the second portion of the path. The processor 302 may be configured to communicate a second unique identifier to the second vehicle 108 to establish a communication channel between the second vehicle 108 and the processor 302.

In accordance with an embodiment, instead of the processor 302, a communication device (such as another RFID device) situated at the second location may assign the second unique identifier to the second vehicle 108. Such assignment may occur when the second vehicle 108 moves past the second location along the second portion of the path. In such an instance, the second vehicle 108 or a communication device situated at the second location may communicate the second unique identifier to the communication device 102. Such communication of the second unique identifier may occur when the second vehicle 108 has reached (or passed) the second location along the second portion of the path.

In accordance with an embodiment, the processor 302 may be configured to receive sensor data from the first vehicle 106, via the transceiver 308. In instances, when the second vehicle 108 is detected on the second portion of the path, the processor 302 may be configured to receive sensor data of the second vehicle 108. The received sensor data may comprise a direction of travel, lane information in which lane a vehicle (such as the first vehicle 106 and/or the second vehicle 108) drives, vehicle type, vehicle size, weight of a vehicle, error information of a device embedded on the vehicle, breakdown information of the vehicle, geospatial position, steering angle, yaw rate, speed, and/or rate of change of speed of the first vehicle 106 and/or the second vehicle 108. The vehicle type may further correspond to a category based on vehicle size, such as a truck, a compact car, a Sport Utility Vehicle (SUV). The vehicle type may further correspond to characteristics of a vehicle, such as an electric vehicle (EV), an internal combustion engine (ICE) vehicle, an autonomous vehicle that may be capable to sense its environment and navigate without a driver manual operation, a vehicle operated by a human driver, a vehicle with advanced driving assisted system, a semi-autonomous vehicle, a vehicle capable of vehicle to vehicle communication, a vehicle incapable of vehicle to vehicle communication, a taxi, or a rental car.

Further, in instances when the first vehicle 106 and/or the second vehicle 108 do not communicate the sensor data to the communication device 102, the processor 302 may be configured to utilize one or more sensors of the sensing device 306 to capture data associated with the first vehicle 106 and/or the second vehicle 108. For example, a speed sensor, such as the RADAR speed gun, may be utilized to detect the speed of the first vehicle 106 and/or the second vehicle 108. An image sensor may be utilized to capture an FOV of the first portion and/or the second portion to detect a direction of travel, type, and size of the first vehicle 106, and/or the second vehicle 108. The FOV may correspond to one or more images or a video. In another example, two image sensors may be pre-installed at two different locations along the second portion. The two image sensors may be separated by a pre-determined distance. The two image sensors may capture one or more images at different time instances to deduce the speed of the second vehicle 108 by use of image processing techniques known in the art.

In accordance with an embodiment, the processor 302 may be configured to detect one or more road surface characteristics on the first portion and/or the second portion of the path. The road surface characteristics may comprise an upward slope, a downward slope, a bank angle, a curvature, a boundary, a road texture, a pothole, a lane marking, and/or a width of the second portion of the path. Such one or more road surface characteristics may be detected by use of the one or more sensors of the sensing device 306.

In accordance with an embodiment, the processor 302 may be configured to detect one or more road hazards on the first portion and/or the second portion of the path. The one or more road hazards may comprise an obstacle, an animal, and/or a landslide. The obstacle may be a static obstacle, such as a heap of construction material, and/or a moving obstacle, such as a human subject. Such detection of one or more road hazards may occur by use of the one or more sensors of the sensing device 306. For example, the FOV captured by the image sensor of the sensing device 306 may be processed to detect the second vehicle 108, which may be present on the second portion of the path. In instances, when the processor 302 detects the second vehicle 108 along the second portion of the path, the processor 302 further communicates data related to the second vehicle 108 to the ECU 104 of the first vehicle 106.

In accordance with an embodiment, the processor 302 may be configured to communicate data associated with the second portion of the path to the first vehicle 106. In accordance with an embodiment, the communicated data associated with the second portion of the path comprises the road surface characteristics of the path and one or more road hazards along the path.

In accordance with an embodiment, the processor 302 may be configured to update the data associated with the second portion of the path communicated to the first vehicle 106. For example, the processor 302 may be configured to continuously communicate an update of the position of the second vehicle 108 on the second portion of the path.

In accordance with an embodiment, the processor 302 may be configured to communicate data associated with the first portion of the path to the second vehicle 108. In accordance with an embodiment, such communication may occur when the second vehicle 108 comprises an ECU configured similar to that of the ECU 104.

In accordance with an embodiment, the processor 302 may be configured to communicate a warning signal to one or both of the first vehicle 106 and the second vehicle 108. Such communication of the warning signal may occur when one or both of the first vehicle 106 and the second vehicle 108 are detected in a wrong lane of the path. 4

In accordance with an embodiment, the processor 302 may be configured to communicate traffic information along the path to one or both of the first vehicle 106 and the second vehicle 108. In accordance with an embodiment, the processor 302 may be configured to simultaneously communicate a warning signal to both of the first vehicle 106 and the second vehicle 108. Such a warning signal may be communicated when both of the first vehicle 106 and the second vehicle 108 are detected to approach each other along a same lane of the path.

In accordance with an embodiment, the processor 302 may be configured to execute control to set validity of the communicated first unique identifier as expired when the first vehicle 106 reaches (or passes) the second location along the second portion of the path. In accordance with an embodiment, the processor 302 may be configured to terminate the established communication channel between the first vehicle 106 and the communication device 102 based on the expiry of the validity of the first unique identifier. Similarly, the processor 302 may be configured to terminate the established communication channel between the second vehicle 108 and the communication device 102. Such termination may occur when the second vehicle 108 reaches (or passes) the first location along the first portion of the path. Such termination may be based on the expiry of the validity of the second unique identifier.

Figure 4A:
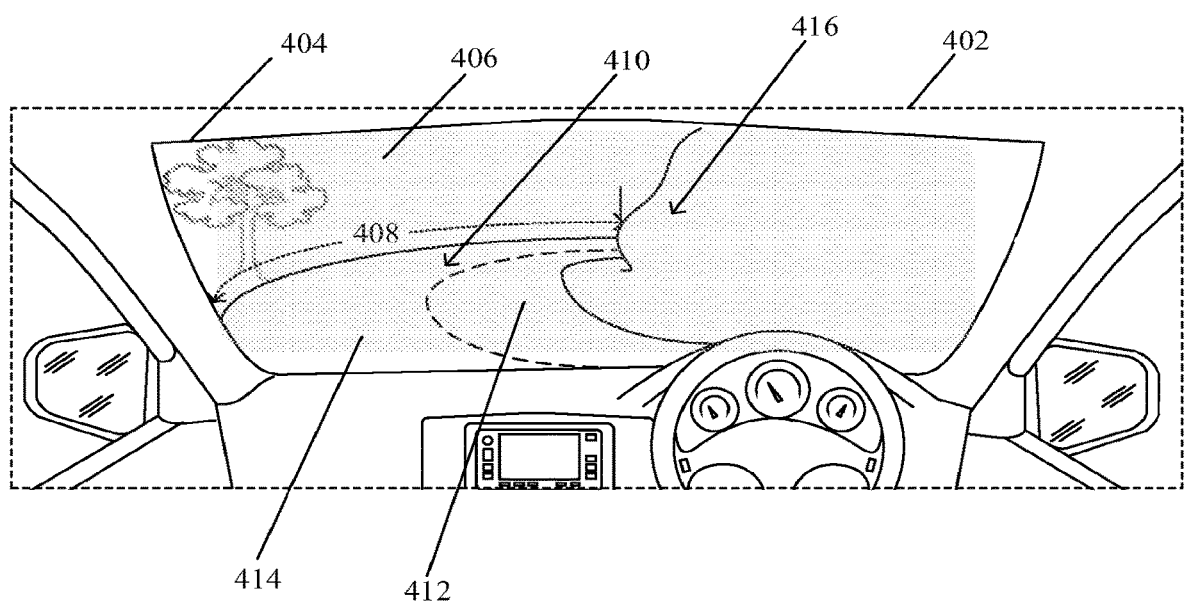
FIGS. 4A, 4B, 4C, 4D, 4E, 4F, 4G, and 4H illustrate a first exemplary scenario for implementation of the disclosed system and method for driving assistance along a path, in accordance with an embodiment of the disclosure.

FIGS. 4A, 4B, 4C, 4D, 4E, 4F, 4G, and 4H illustrate a first exemplary scenario for the implementation of the disclosed system and method for driving assistance along a path, in accordance with an embodiment of the disclosure. FIGS. 4A, 4B, 4C, 4D, 4E, 4F, 4G, and 4H are explained in conjunction with elements from FIG. 1, FIG. 2, and FIG. 3. With reference to FIG. 4A, there is shown a cut section 402 of an interior portion of the first vehicle 106, a windshield 404, an AR-HUD 406, a first portion 408 of a path 410, a first lane 412, a second lane 414, and a mountain area 416 of a mountain.

In accordance with the first exemplary scenario, the AR-HUD 406 may correspond to the display 210 (FIG. 2). The first vehicle 106 may move towards a first location along the first portion 408 of the path 410. A view of the outside, such as the first portion 408 of the path 410 and the mountain area 416 may be visible through the AR-HUD 406 from the interior portion of the first vehicle 106. The AR-HUD 406 may be a transparent display. The AR-HUD 406 may be integrated with the windshield 404 for a hands-free and unobtrusive display for occupant(s) of the first vehicle 106. A second portion 418 (shown in FIG. 4B) of the path 410, may be hidden from the mountain area 416 of the mountain. The second portion 418 may not be visible from the first location in a direct line of sight.

With reference to FIG. 4A, a user, such as the driver 112, at a first location of the first portion 408, may want to see the second portion 418 of the path 410. The driver 112 may want to see if road hazards are present in the second portion 418 of the path 410. The driver 112 may further want to know the type, size, and/or position of road hazards in real time to drive safely along the path 410. It may be beneficial for the driver 112 to be aware of the road surface characteristics of the second portion 418, such as a bank angle, slope conditions, and/or information related to curvature.

Figure 4B:
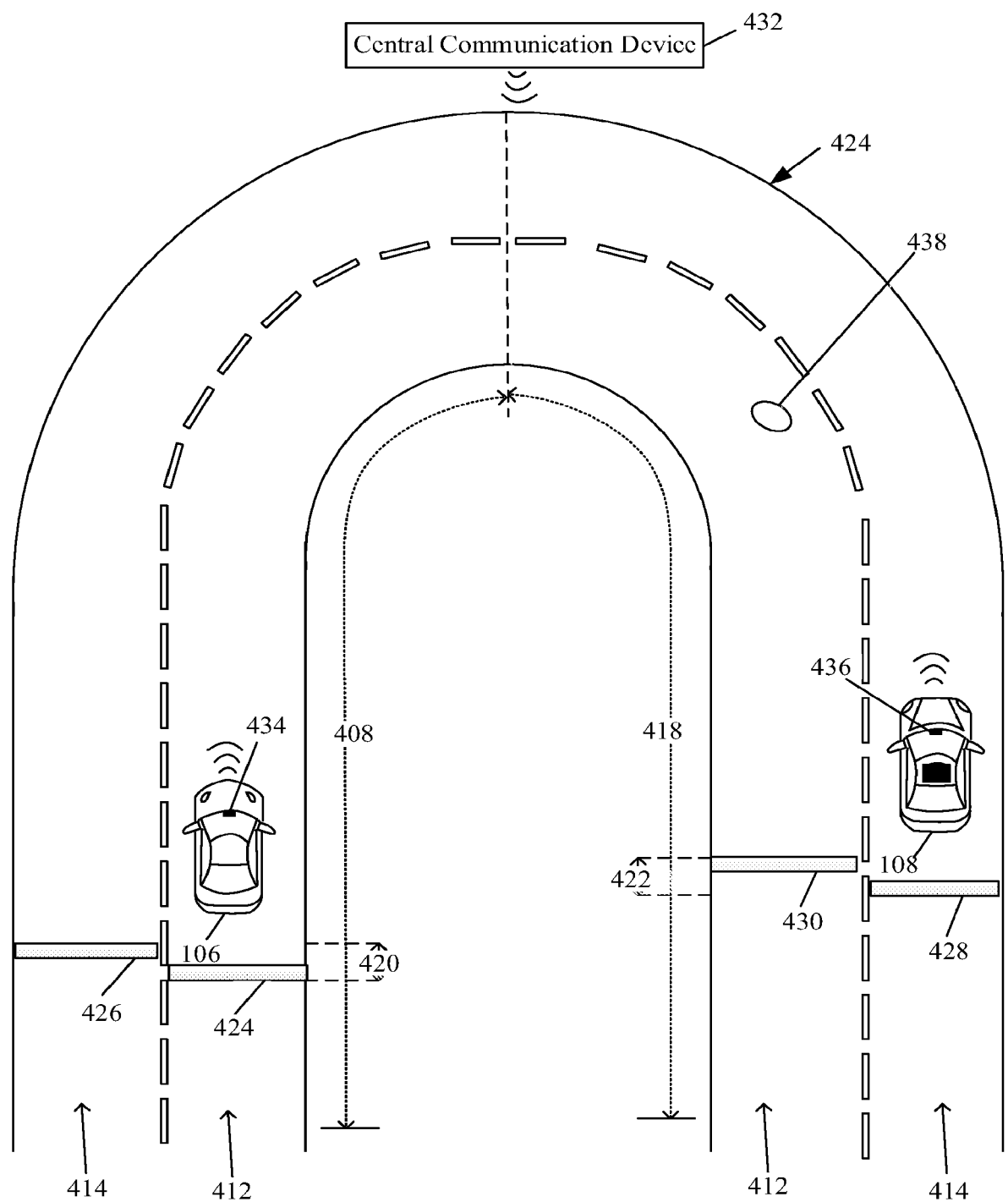

In operation, the first vehicle 106 may move past the first location along the first portion 408 of the path 410, via the first lane 412. Now, FIG. 4B is explained to depict the sequence of operations. FIG. 4B shows a plan view of the scenario depicted in FIG. 4A.

With reference to FIG. 4B, there is shown the first vehicle 106, the second vehicle 108, the first portion 408, the path 410, the first lane 412, the second lane 414, the second portion 418, a first location 420, a second location 422, a first communication device 424, a second communication device 426, a third communication device 428, a fourth communication device 430, and a central communication device 432. There is further shown a first ECU 434 installed in the first vehicle 106, a second ECU 436 installed in the second vehicle 108, and a pothole 438 in the second portion 418 of the path 410.

In accordance with the first exemplary scenario, the central communication device 432 may correspond to the communication device 102. The first communication device 424, the second communication device 426, the third communication device 428, and the fourth communication device 430 may correspond to the one or more other communication devices, such as the RFID device. The first ECU 434 may correspond to the ECU 104. The second ECU 436 may correspond to an ECU with configurations and functionalities similar to that of the ECU 104.

In operation, the first communication device 424 may be configured to determine whether the first vehicle 106 has reached (or passed) the first location 420 along the first portion 408 of the path 410 by use a wireless communication or sensing devices, such as the RFID device, an ultrasonic sensor, and/or an imaging device. The first communication device 424 may be configured to communicate the first unique identifier to the first vehicle 106 when the first vehicle 106 passes the first location 420.

In accordance with an embodiment, the first ECU 434 may be configured to receive the first unique identifier from the first communication device 424 when the first vehicle 106 has passed the first location 420. The first ECU 434 may be configured to communicate the first unique identifier to the central communication device 432. In instances where the central communication device 432 communicates the first unique identifier to the first vehicle 106, further communication of the first unique identifier between the first ECU 434 and the central communication device 432 may not be required.

In accordance with an embodiment, the first ECU 434 may be configured to establish a communication channel between the first vehicle 106 and the central communication device 432, based on the received first unique identifier. Similarly, the second ECU 436 may be configured to receive the second unique identifier from the third communication device 428 situated at the second location 422. Such communication may occur when the second vehicle 108 has passed the second location 422. The second ECU 436 may be configured to communicate the second unique identifier to the central communication device 432.

In accordance with an embodiment, the first ECU 434 may be configured to receive data associated with the second portion 418 of the path 410 from the central communication device 432. The received data associated with the second portion 418 of the path comprises road surface characteristics of the path 410, such as the pothole 438, and one or more road hazards along the path 410.

In accordance with an embodiment, the first ECU 434 may be configured to generate alert information associated with the second portion 418 of the path 410 based on the received data. For example, the first ECU 434 may be configured to generate the alert information when a current speed of the second vehicle 108 received from the central communication device 432 is higher than a pre-specified threshold speed. Based on information acquired from the first vehicle 106, when the central communication device 432 detects the first vehicle 106 in the second lane 414, and a direction of travel of the first vehicle 106 is detected towards the second location 422, the central communication device 432 may be configured to communicate a warning signal, such as "wrong lane", to the first vehicle 106. In accordance with an embodiment, the warning signal may be communicated to both the first vehicle 106 and the second vehicle 108 when both of the first vehicle 106 and the second vehicle 108 are detected along the same lane, such as the second lane 414 of the path 410.

In accordance with an embodiment, the first ECU 434 may be configured to update the generated alert information that corresponds to a position of the second vehicle 108 on the second portion 418 of the path 410. Such an update at the first vehicle 106 may occur based on the data received from the communication device 102.

Figure 4C:
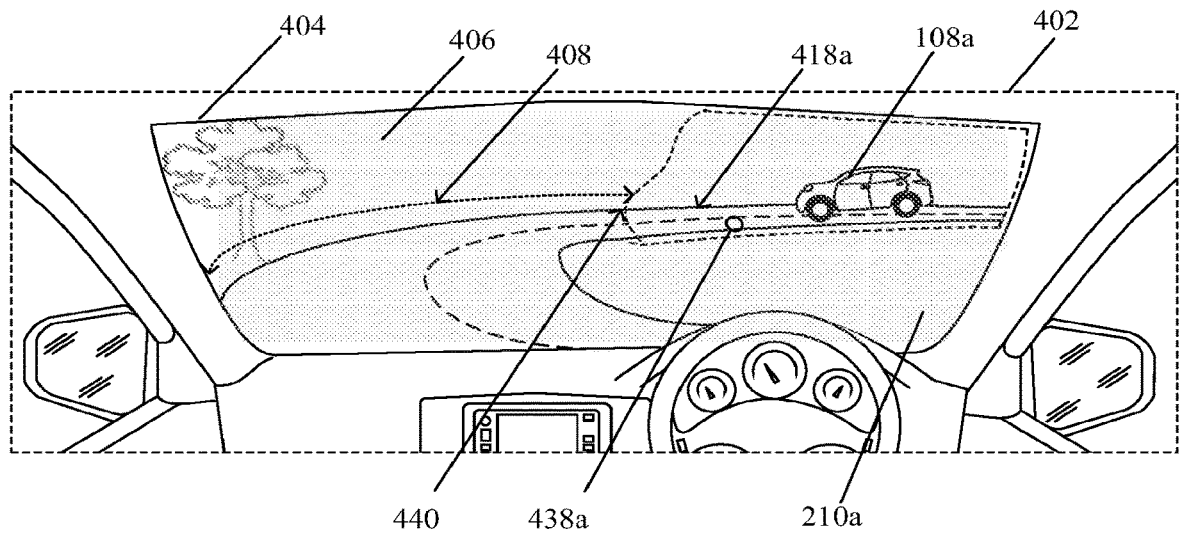

FIG. 4C shows the generated alert information associated with the second portion 418 of the path 410 as a graphical view displayed on the display 210, such as the AR-HUD 406, of the first vehicle 106. With reference to FIG. 4C, there is shown a combined view 440 of the first portion 408 and the generated alert information associated with the second portion 418 of the path 410.

In accordance with an embodiment, the first ECU 434 may be configured to control display of the combined view 440 of the first portion 408 and the generated alert information associated with the second portion 418 of the path 410. The first ECU 434 may be configured to control display of the combined view 440 such that the first portion 408 and generated second portion 418a is rendered as a continuous stretch of the path 410 on the AR-HUD 406 of the first vehicle 106. The generated alert information includes information with regard to a representative icon 108a of the second vehicle 108, such as type, size, and position along the generated second portion 418a of the path 410. The generated alert information may further include indications of one or more road hazards and road surface characteristics, such as an indication 438a for the pothole 438 on the second portion 418 of the path 410. In accordance with an embodiment, the first ECU 434 may be configured to control display of the combined view 440 such that the generated alert information is overlaid on a part of the first portion 408 (as shown in FIG. 4D).

Figure 4D:
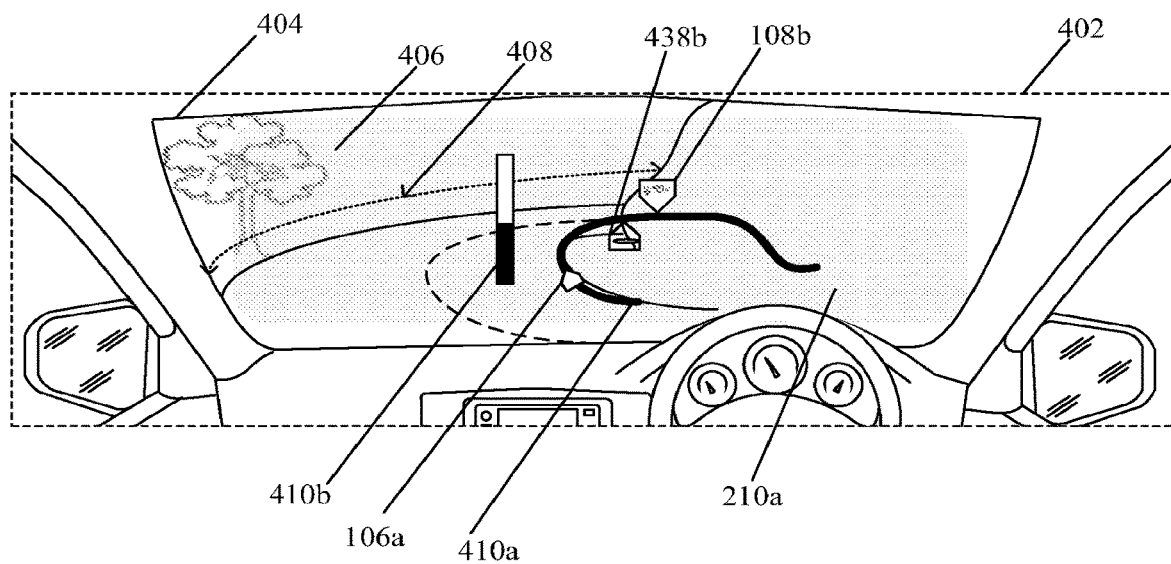

FIG. 4D shows the generated alert information displayed on the display 210, such as the AR-HUD 406, of the first vehicle 106, in accordance with an embodiment. With reference to FIG. 4D, there is shown several indications with respect to the second portion 418 of the path 410. The indications may include a driving route 410a where the first vehicle 106 drives, a representative icon 106a of the first vehicle 106 which shows a position of the first vehicle 106 on the driving route 410a, an indication 438b of the pothole 438 which shows a position of the pothole 438 on the driving route 410a, and another representative icon 108b of the second vehicle 108 according to vehicle type, such as a car, size, and position of the second vehicle 108. Such indications correspond to the one or more features that may be updated based on the data received from the central communication device 432. There is further shown a graphical bar 410b that indicates a distance from the first vehicle 106 to the second vehicle 108. A volume, as shown by a dark shaded portion, of the graphical bar 410b decreases when the second vehicle 108 comes near to the first vehicle 106. In instances when a plurality of oncoming vehicles exist along the second portion 418, the graphical bar 410b shows the distance for an oncoming vehicle that is nearest to the first vehicle 106. For example, a predetermined minimum set of sensor data is already defined for communication between vehicles and central communication device 432. At a certain moment, such as when the first vehicle 106 approaches a blind curve near the mountain area 416 of the mountain (FIG. 4D), the first ECU 434 receives an information of the second vehicle 108 from the central communication device 432. The information includes a geographical position (such as longitude 35°43' and latitude 135°26'), speed (such as 40 mile per hour (MPH)), a driving direction (such as northeast direction), and/or size or type of the second vehicle 108 (such as sports utility vehicle (SUV)).

The first ECU 434 may further receive information that corresponds to whether or not the second vehicle 108 (represented as 108b at the UI 210a) is approaching towards the first vehicle 106 and has passed the third communication device 428. For instance, the received information may include a data field, such as "Is the <second vehicle 108> approaching towards the first vehicle 106", for which corresponding value may be "Yes". The value "Yes" received for the above data field may denote that the second vehicle 108 (represented as 108b at the UI 210a) is approaching towards the first vehicle 106 and has passed the third communication device 428. The first ECU 434 may determine a level of alert based on the received information of the second vehicle 108. The distance between the first vehicle 106 and the second vehicle 108 may be calculated based on the received geographical position of the second vehicle 108 and a current geographical position of the first vehicle 106. For example, a calculated distance between the first vehicle 106 and the second vehicle 108 is less than predetermined threshold, such as "50 meters". This may indicate that a high risk alert may be required to be generated and displayed at the AR-HUD 406, and a color of the graphical bar 410*b* is to be turned to red from previously green. The color is green when the calculated distance between the first vehicle 106 and the second vehicle 108 is more than the predetermined threshold.

In an instance, when the sensing system 218 of the first vehicle 106, such as the imaging device, does not detect the second vehicle 108, it may be assumed that the driver 112 of the first vehicle 106 cannot visually identify the second vehicle 108. In another instance, when the sensing system 218 of the first vehicle 106, such as the imaging device, does not detect the second vehicle 108, a calculated distance to the second vehicle 108 is less than the predetermined threshold, such as "50 meters", and/or a received speed of the second vehicle 108 is more than another predetermined speed threshold, such as "80 MPH", a color of the other representative icon 108*b* of the second vehicle 108 turns red in color or an audio alert is issued to notify a high risk alert to the driver 112 of the first vehicle 106.

Figure 4E:
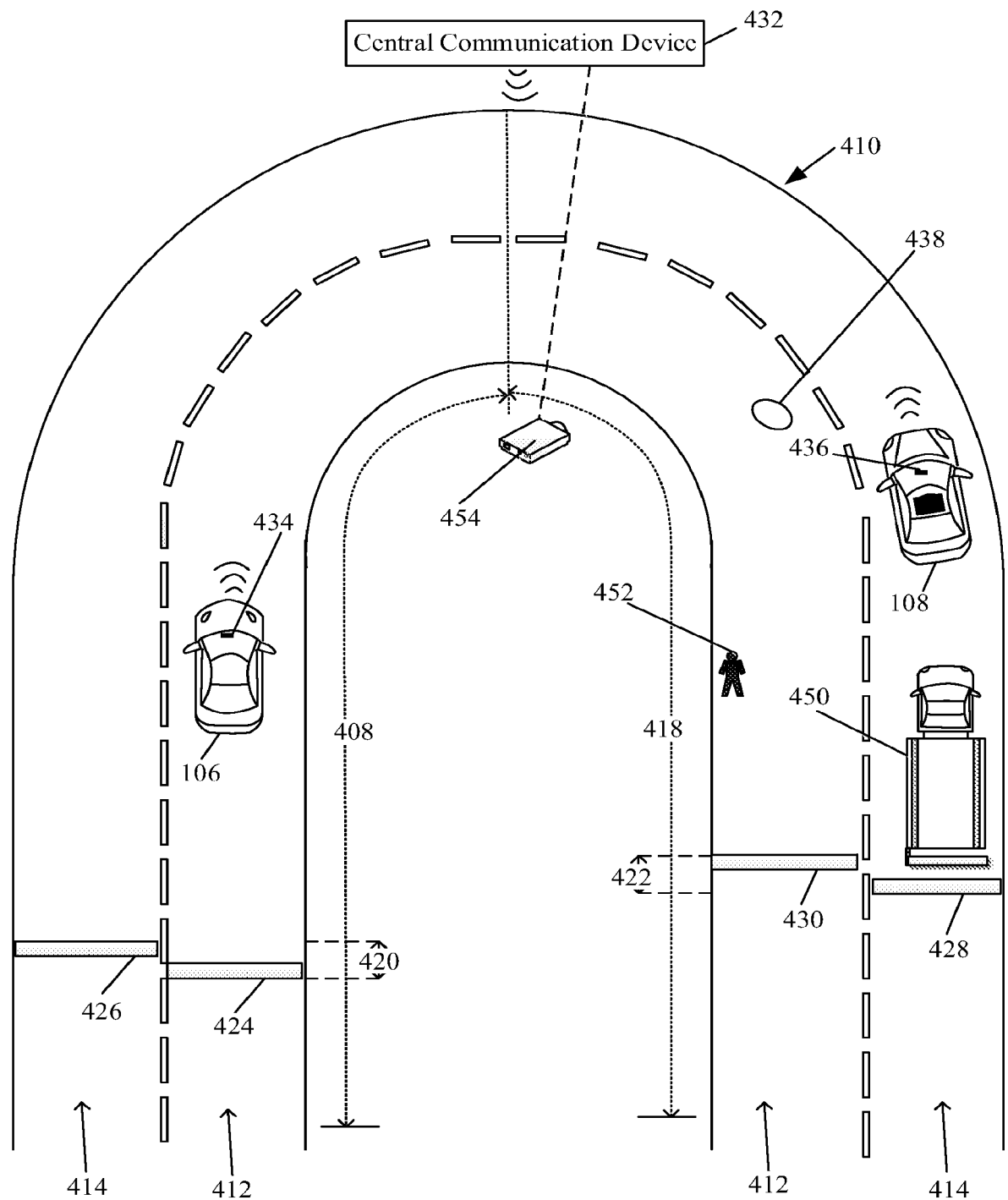

With reference to FIG. 4E, there is shown a truck 450, a pedestrian 452, a camera 454, which may be associated with the central communication device 432, on the second portion 418, of the path 410. The truck 450 may not have an ECU with configurations and functionalities similar to that of the ECU 104. The camera 454 may correspond to the one or more sensors of the sensing device 306. The truck 450 and the pedestrian 452 may move towards the second location 422 along the second portion 418 of the path 410.

In operation, the central communication device 432 may be configured to detect one or more other potential road hazards, such as the truck 450 and the pedestrian 452, on the second portion 418. Such detection may occur when the truck passes the second location 422 along the second portion 418 of the path 410. The central communication device 432 may determine the vehicle type, size, and position of the truck 450 by use of the camera 454. One or more other sensors, such as the RADAR speed gun (not shown), may be associated with the central communication device 432. Such one or more other sensors may detect the speed and position of the truck 450 on the second portion 418 of the path 410.

In accordance with an embodiment, the central communication device 432 may be configured to communicate an update to the first vehicle 106. The update may correspond to the detected one or more other road hazards. The first ECU 434 may be configured to dynamically update the generated alert information based on the received update.

Figure 4F:
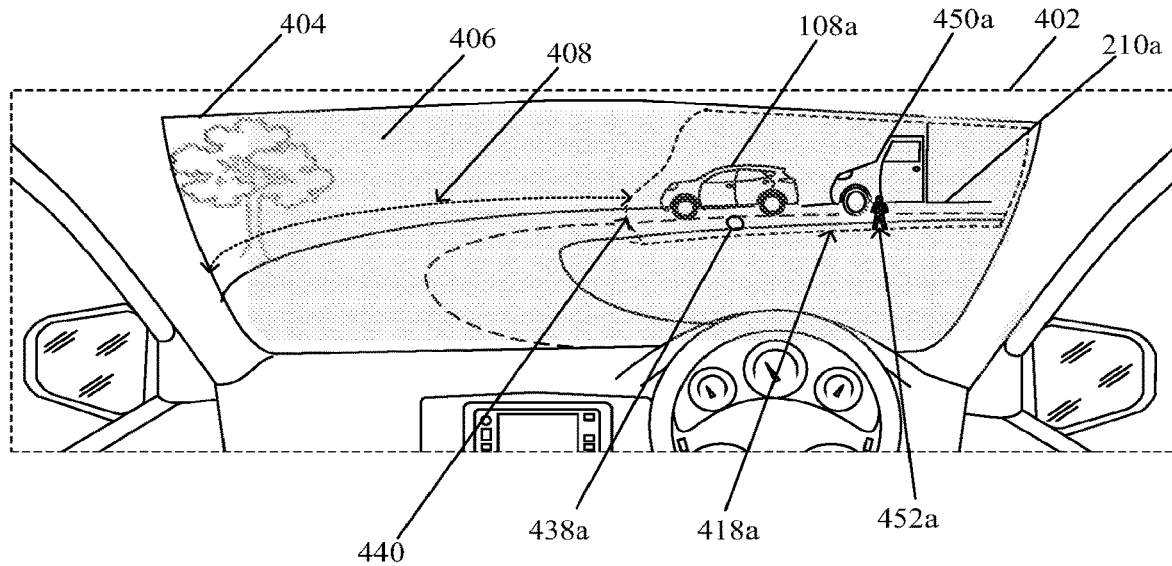

FIG. 4F shows a graphical view of an update of the generated alert information associated with the second portion 418 of the path 410. With reference to FIG. 4F, there is shown an indication 450*a* of the truck 450 and an indication 452*a* of the pedestrian 452 in the combined view 440. In this case, the first ECU 434 determines a high risk because a curvature of an oncoming curving road, received from central communication device 432 as one of the road surface characteristics, is larger than a threshold angle, and the oncoming second vehicle 108 may be the truck 450. To notify this high risk situation to the driver of the first vehicle 106, the indication 450*a* of the truck 450 may be highlighted by red color or an audio alert may be issued. In accordance with an embodiment, the first ECU 434 may be configured to control display of the updated second portion 418 in the combined view 440, such that the generated alert information is overlaid on a part of the first portion 408 (as shown in FIG. 4G).

Figure 4G:
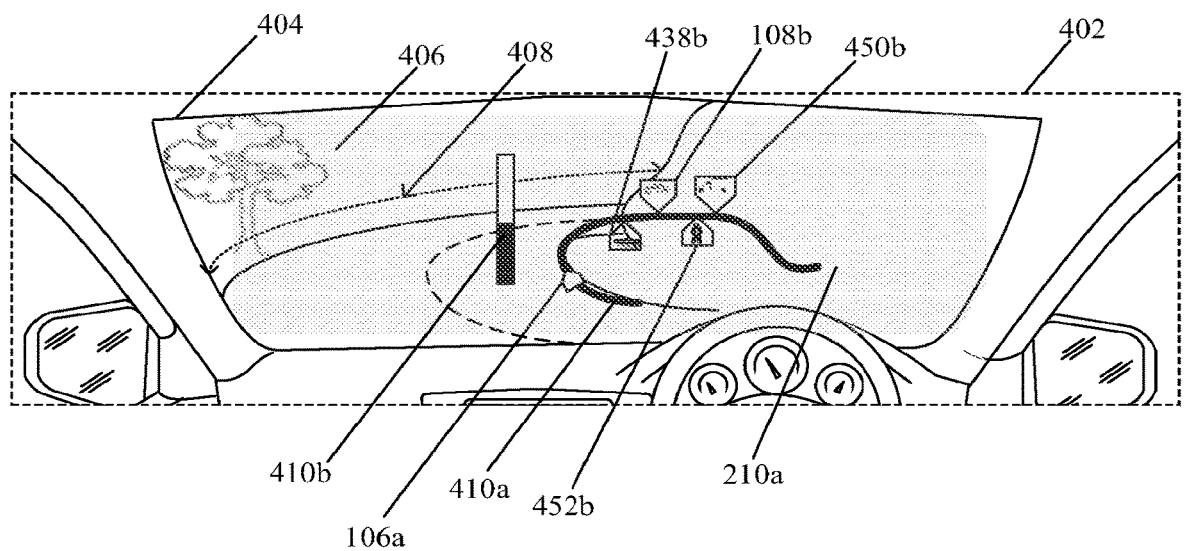

With reference to FIG. 4G, there is shown an indication 450*b* of the truck 450 and an indication 452*b* of the pedestrian 452. The first ECU 434 may be configured to control display to update one or more other features in the combined view 440, such as the indication 450*b* of the truck 450 and the indication 452*b* of the pedestrian 452.

In accordance with an embodiment, the combined view 440 may comprise an indication of current speed of the second vehicle 108 and an indication of current distance to pass the second vehicle 108. The combined view 440 may further comprise an indication of a change in speed of the first vehicle 106 that is required to pass the second portion 418 of the path 410. Thus, such operations and indications may provide enhanced visualization and driving assistance at the first vehicle 106 and/or at the second vehicle 108.

Figure 4H:
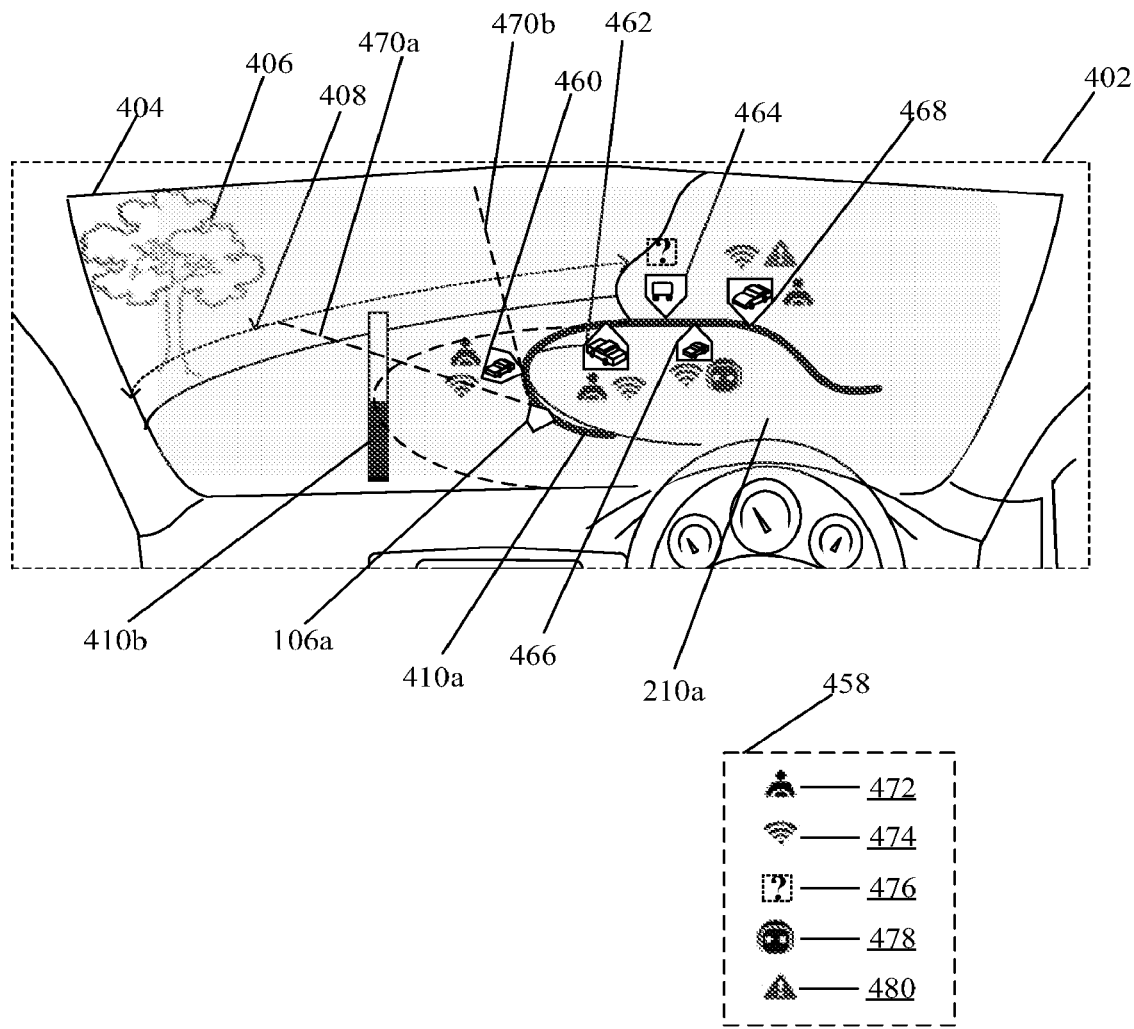

FIG. 4H shows a view the generated alert information displayed on the display 210, such as the AR-HUD 406, of the first vehicle 106, in accordance with an alternative embodiment. FIG. 4H depicts a scenario where there may be a plurality of oncoming vehicles, such as 5 oncoming vehicles, at the driving route 410*a* that may approach the first vehicle 106. The plurality of oncoming vehicles may correspond to the second vehicle 108 (FIG. 1). The driving route 410*a* displays the path 410 (including the hidden second portion 418) along which the first vehicle 106 drives to pass the mountain area 416 of the mountain towards the second portion 418 of the path 410.

With reference to FIG. 4H, the five oncoming vehicles may be represented as graphical icons 460, 462, 464, 466, and 468 that indicate current position of the five oncoming vehicles on the driving route 410*a* and a range of vision of the driver 112 may is shown by two dashed lines 470*a* and 470*b*. For the sake of brevity, there is shown a legend 458 to depict different symbols used in the vicinity of the graphical icons 460, 462, 464, 466, and 468. The symbols or indications include a human driver symbol 472, a communication symbol 474, a missing information symbol 476, an autonomous mode symbol 478, and an error symbol 480.

The human driver symbol 472 indicates that a vehicle is operated by a human driver, and the vehicle is not in autonomous mode. The communication symbol 474 indicates that a vehicle has a capability of establishing communication with a communicative device, such as the central communication device 432. The missing information symbol 476 (such as a question mark "?") indicates that the first vehicle 106 cannot receive the sensor data of a vehicle, such as the third oncoming vehicle (represented by the third graphical icon 464). The autonomous mode symbol 478 indicates that a vehicle, such as the fourth vehicle (represented by the fourth graphical icon 466), is an autonomous vehicle or currently operating in an autonomous mode. The error symbol 480 indicates that there are one or more errors in the sensor data received from a vehicle, such as the fifth oncoming vehicle (represented by the fifth graphical icon 468).

The range of vision of the driver 112 of the first vehicle 106 may be from the interior of the first vehicle 106. The range of vision of the driver 112 that is represented by the two dashed lines 470*a* and 470*b* may be displayed based on the sensor data, such as current geographic position, of the first vehicle 106 and characteristics of the driving route 410*a*, and a visibility interference or a part visibility blockage due to the mountain area 416.

A first oncoming vehicle, as represented by the first graphical icon 460, may be in the first portion 408 of the path 410, and may be in the range of vision of the driver 112. The human driver symbol 472 and the communication symbol 474 is also rendered in the vicinity of the first graphical icon 460 of first oncoming vehicle. The communication symbol 474 further indicates that the first vehicle 106 (shown as the representative icon 106a on the driving route 410a) has already received sensor data of the first oncoming vehicle (shown as the first graphical icon 460 on the driving route 410a). The human driver symbol 472 and a communication symbol 474 may be displayed based on the received sensor data from the first oncoming vehicle.

The second oncoming vehicle (one of the plurality of the oncoming vehicles) that is represented by the second graphical icon 462, may communicate with the central communication device 432. The first vehicle 106 may receive sensor information of the second oncoming vehicle from the central communication device 432.

The third oncoming vehicle (one of the plurality of the oncoming vehicles) that is represented by the third graphical icon 464 on the driving route 410a, may not have a communication device or an ECU similar to that of the wireless communication system 206 or the ECU 104 (FIG. 2) to establish a communication with the central communication device 432. In such an instance, the central communication device 432 may detect the third oncoming vehicle by acquiring information from another device, such as the camera 454, which captures objects on the path 410. For example, the central communication device 432 may acquire information of an existence or vehicle type of a vehicle, such as the third oncoming vehicle, and a geographical location of the vehicle, such as the third oncoming vehicle, from the camera 454. The central communication device 432 may then provide the acquired information of an existence, the vehicle type, and a geographical location of the vehicle, such as the third oncoming vehicle in this case which cannot communicate with the central communication device 432, to the first vehicle 106.

In accordance with an embodiment, based on the received information from the central communication device 432, the first ECU 434 of the first vehicle 106 may determine the existence, the vehicle type (such as a hatchback car), and the geographical location of a vehicle, such as the third oncoming vehicle, hidden behind the mountain area 416. However, as other sensor data of the third oncoming vehicle (represented by the third graphical icon 464) is not received, and as the driver 112 may not understand a current situation of the third oncoming vehicle, the first ECU 434 may highlight the third graphical icon 464 of the third oncoming vehicle by a change in color or a size of the third graphical icon 464. The missing information symbol 476 that indicates the first vehicle 106 cannot receive the sensor data of the third oncoming vehicle, may be rendered on the AR-HUD 406 or the display 210 of the first vehicle 106. A voice alert that indicates the driver 112 needs to be cautious for the third oncoming vehicle may be generated via the audio interface 208.

In accordance with an embodiment, a plurality of cameras or sensors may be installed along a roadside, such as the path 410. The plurality of cameras may be communicatively coupled to the central communication device 432. In this case, when the third oncoming vehicle passes the first camera, such as the camera 454, the camera 454 may capture an image of the third oncoming vehicle, and record the timestamp of capture, such as a first timestamp. The camera 454 may communicate the captured image comprising at least the third oncoming vehicle with recorded first timestamp to the central communication device 432. Similarly, another camera installed at a predetermined distance, may capture another image of a vehicle in motion, such as the third oncoming vehicle and record the timestamp of capture, such as a second timestamp. The other camera may communicate the captured other image comprising at least the third oncoming vehicle with recorded second timestamp to the central communication device 432. Thus, the central communication device 432 may calculate the speed of the third oncoming vehicle based on the time taken to travel the predetermined distance. The time taken may be easily calculated based on an elapsed time difference between the second timestamp and the first timestamp. Thus, by use of this calculated speed of the third oncoming vehicle, the central communication device 432 may communicate the speed information to the first vehicle 106. In such an instance, the missing information symbol 476 may not be displayed or another icon (not shown) may be displayed in the vicinity of the third graphical icon 464.

The fourth oncoming vehicle (one of the plurality of the oncoming vehicles) that is represented by the fourth graphical icon 466 on the driving route 410a, may communicate with the central communication device 432. The first ECU 434 of the first vehicle 106 receives the sensor data of the fourth oncoming vehicle from the central communication device 432 and determines that the fourth oncoming vehicle is an autonomous vehicle or currently operating in an autonomous mode. The autonomous mode symbol 478 and the communication symbol 474 may be rendered at the AR-HUD 406 or the display 210 of the first vehicle 106.

The fifth oncoming vehicle (one of the plurality of the oncoming vehicles) that is represented by the fifth graphical icon 468 on the driving route 410a, may also communicate with the central communication device 432 or may directly communicate with the first vehicle 106 in a vehicle-to-vehicle (V2V) communication. With regards to the fifth oncoming vehicle, the human driver symbol 472, the communication symbol 474, and an error symbol 480 may be rendered based on the sensor data from the fifth oncoming vehicle in a V2V communication. The error symbol 480 indicates that there are one or more errors in the sensor data received from the fifth oncoming vehicle (represented by the fifth graphical icon 468). The error symbol 480 may be an error flag. For example, if an image sensor of an advanced driving assisted system (ADAS) of the fifth oncoming vehicle is defective, an ECU of the fifth oncoming vehicle may send an error flag for its sensing capability to the central communication device 432. In this case, the first ECU 434 of the first vehicle 106 may identify the error flag in the sensor data of the fifth oncoming vehicle, and render the error symbol 480 near the fifth graphical icon 468 of the fifth oncoming vehicle. Thus, the driver 112 may easily understand a need to be careful with regard to the fifth oncoming vehicle for safety purpose.

Figure 5:
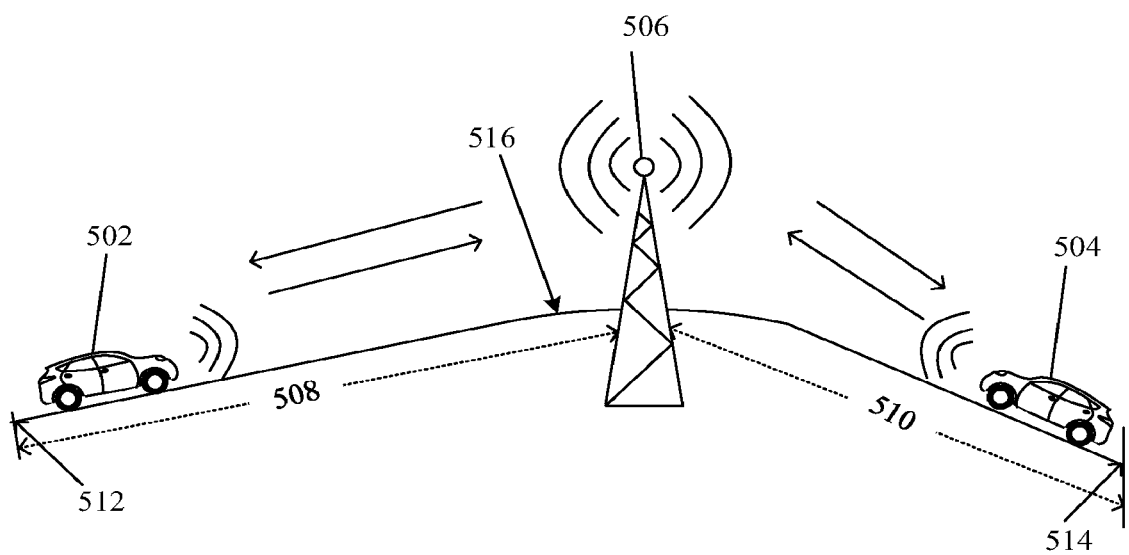
FIG. 5 illustrates a second exemplary scenario for implementation of the disclosed system and method for driving assistance along a path, in accordance with an embodiment of the disclosure.

FIG. 5 illustrates a second exemplary scenario for implementation of the disclosed system and method for driving assistance, in accordance with an embodiment of the disclosure. FIG. 5 is explained in conjunction with elements from FIG. 1, FIG. 2, and FIG. 3. With reference to FIG. 5, there is shown a first car 502, a second car 504, an RSU 506, a first portion 508, a second portion 510, a first location 512, a second location 514, and a path 516.

In accordance with the second exemplary scenario, the first car 502 and the second car 504 may correspond to the first vehicle 106 and the second vehicle 108, respectively. The RSU 506 may correspond to the communication device 102. The first car 502 may pass the first location 512, along the first portion 508 of the path 516. The second car 504 may pass the second location 514, along the second portion 510 of the path 516. The second portion 510 of the path 516 may not be visible from the first location 512, due to an uphill road condition. Similarly, the first portion 508 of the path 516 may not be visible from the second location 514. The path 516 may be a single lane road.

In operation, the RSU 506 may be configured to communicate a first unique identifier to the first car 502 when the first car 502 has passed the first location 512. Similarly, the RSU 506 may be configured to communicate a second unique identifier to the second car 504, when the second car 504 has passed the second location 514.

In accordance with an embodiment, the RSU 506 may be configured to establish communication channels with one or both of the first car 502 and the second car 504. The RSU 506 may be configured to communicate data associated with the second portion 510 of the path 516 to the first car 502. Similarly, the RSU 506 may communicate data associated with the first portion 508 of the path 516 to the second car 504. The communicated data may include one or more road surface characteristics on the first portion 508 and/or the second portion 510 of the path 516. The road surface characteristics may correspond to the downward slope, boundary, road texture, and/or width of the first portion 508 and the second portion 510 of the path 516.

In accordance with an embodiment, alert information may be generated at the first car 502 and/or the second car 504, based on the data received from the RSU 506. One or more circuits in the ECU 104 of the first car 502 may be configured to generate the alert information when a current speed of the first car 502 is detected as higher than a pre-specified threshold speed. In accordance with an embodiment, one or more circuits in the ECU 104 of the first car 502 may be configured to determine a safe speed required to traverse the downward slope along the second portion 510 of the path 516. Such determination of the safe speed may be dynamically updated based on the current position of the first car 502 or the oncoming second car 504.

Figure 6:
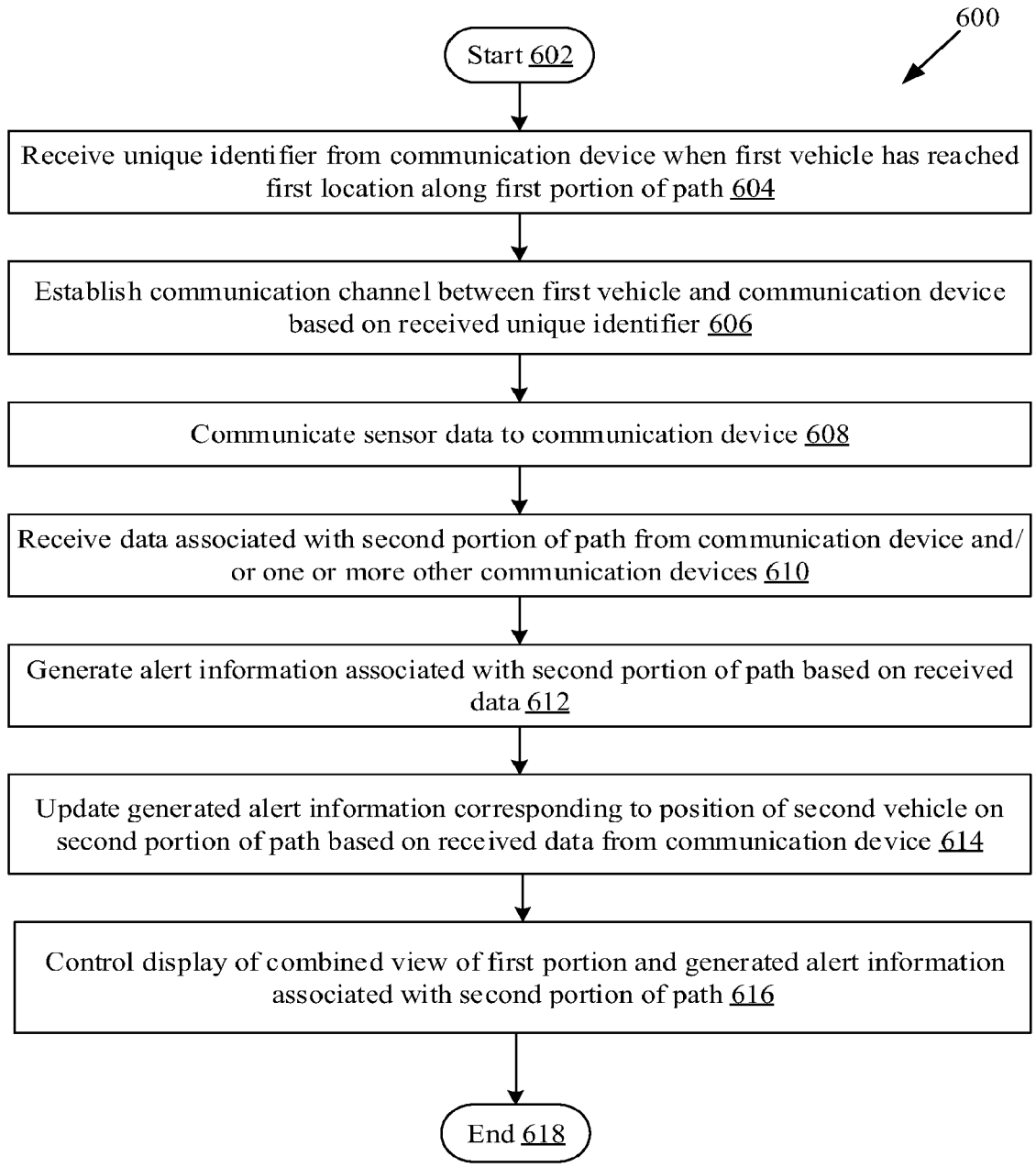
FIG. 6 is a flow chart that illustrates an exemplary method for driving assistance along a path, in accordance with an embodiment of the disclosure.

FIG. 6 depicts a flow chart that illustrates an exemplary method for driving assistance along a path, in accordance with an embodiment of the disclosure. With reference to FIG. 6, there is shown a flow chart 600. The flow chart 600 is described in conjunction with FIGS. 1, 2, 3, 4A, 4B, 4C, 4D, 4E, 4F, and 4G. The method starts at step 602 and proceeds to step 604.

At step 604, a unique identifier may be received when a first vehicle 106 has reached (or passed) a first location, such as the first location 420 (FIG. 4B), along a first portion, such as the first portion 408, of a path (such as the path 410). Such a unique identifier may be received from the communication device 102. In accordance with an embodiment, the unique identifier may be received from another communication device situated at the first location, such as the first communication device 424. At step 606, a communication channel may be established between the first vehicle 106 and the communication device 102, based on the received unique identifier. For example, the communication device 102 accepts a communication with a vehicle if the vehicle transmits an authorized unique identifier. At step 608, sensor data may be communicated to the communication device 102. The sensor data may be associated with the first vehicle 106. At step 610, data associated with a second portion, such as the second portion 418, of the path 410 may be received from the communication device 102.

At step 612, alert information associated with the second portion of the path may be generated based on the received data. At step 614, the generated alert information that may correspond to a position of the second vehicle 108, on the second portion of path, may be updated. Such an update may occur based on the data received from the communication device 102. At step 616, display of a combined view of the first portion and the generated alert information associated with the second portion of the path may be controlled. The display may occur by use of the UI 210a (FIG. 2). Further, FIGS. 4C, 4D, 4F, 4G, and 4H are examples of the result of the step 616. Control passes to end step 618.

In above examples, the AR-HUD 406 is used to display road hazards or road surface characteristics. However, all of information illustrated by FIGS. 4C, 4D, 4F, 4G, and 4H can be displayed on the display 210 of the first vehicle 106. For example, if a brightness level of outside vehicle environment is low, displayed content on the AR-HUD 406 may affect outside visibility from the point of view of the driver 112. Therefore, the displayed content on the AR-HUD 406 may be switched to be displayed on the display 210 when the outside brightness level is lower than a visibility threshold. A time of day, such as night time, or an event of turning "ON" a head light at the first vehicle 106 or the second vehicle 108, may be considered for the switching of the displayed content from the AR-HUD 406 to the display 210.

Figure 7:
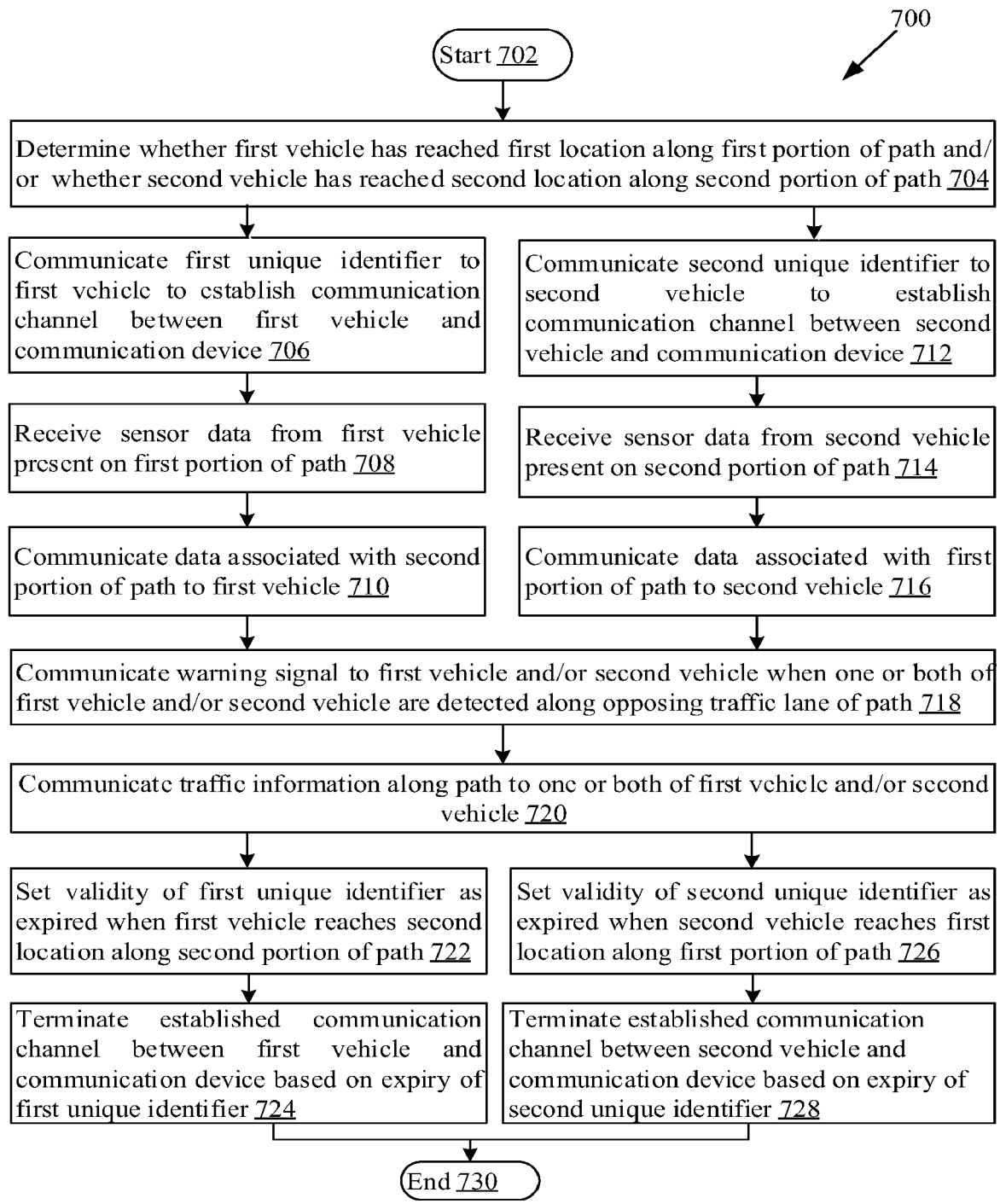
FIG. 7 is another flow chart that illustrates another exemplary method for driving assistance along a path, in accordance with an embodiment of the disclosure.

FIG. 7 depicts another flow chart that illustrates another exemplary method for driving assistance along a path, in accordance with an embodiment of the disclosure. With reference to FIG. 7, there is shown a flow chart 700. The flow chart 700 is described in conjunction with FIGS. 1, 3, and 5. The method starts at step 702 and proceeds to step 704.

At step 704, whether the first vehicle 106 has reached (or passed) a first location (such as the first location 512) along a first portion (such as the first portion 508) of a path (such as the path 516), may be determined at the communication device 102 (an example of the communication device 102 is the RSU 506 (FIG. 5)). It may be further determined whether the second vehicle 108 has reached (or passed) a second location (such as the second location 514) along a second portion (such as the second portion 510) of the path. In instances when the first vehicle 106 has reached (or passed) the first location along the first portion of the path, control passes to step 706. In instances when the second vehicle 108 has reached (or passed) the second location along the second portion of the path, control passes to step 712.

At step 706, a first unique identifier may be communicated to the first vehicle 106 to establish a communication channel between the first vehicle 106 and the communication device 102. Such communication of the first unique identifier may occur when the first vehicle 106 reaches (or passes) the first location along the first portion of the path. At step 708, sensor data from the first vehicle 106 that may be present on the first portion of the path, may be received at the communication device 102.

At step 710, data associated with the second portion of the path may be communicated from the communication device 102 to the first vehicle 106. At step 712, a second unique identifier may be communicated to the second vehicle to establish a communication channel between the second vehicle 108 and the communication device 102. Such communication of the second unique identifier may occur when the second vehicle 108 reaches (or passes) the second location along the second portion of the path.

At step 714, sensor data from the second vehicle present on the second portion of the path, may be received at the communication device 102. At step 716, data associated with the first portion of the path may be communicated from the communication device 102 to the second vehicle 108. At step 718, a warning signal may be communicated to one or both of the first vehicle 106 and/or the second vehicle 108. For example, in case that the communication device 102 (or the RSU 506) identifies an error in the sensor data of one of the vehicles on the path, a breakdown of one of the vehicles and/or a vehicle incapable of communicating with the communication device 102, the warning signal may be communicated to other vehicles on the path. Such communication may occur when one or both of the first vehicle 106 and/or the second vehicle 108 are detected along an opposing traffic lane of the path.

At step 720, traffic information along the path may be communicated to one or both of the first vehicle 106 and the second vehicle 108. In instances when the first vehicle 106 (that comes from the first location) has reached (or passed) the second location along the second portion, control passes to step 722. In instances when the second vehicle 108 (that comes from the second location) has reached (or passed) the first location along the first portion, control passes to step 726.

At step 722, validity of the first unique identifier may be set as expired when the first vehicle 106 has reached (or passed) the second location along the second portion of the path. At step 724, the established communication channel between the first vehicle 106 and the communication device 102 may be terminated based on the expiry of the validity of the first unique identifier. Control passes to end step 730 with respect to the first vehicle 106.

At step 726, validity of the second unique identifier may be set as expired when the second vehicle 108 has reached (or passed) the first location along the first portion of the path. At step 728, the established communication channel between the second vehicle 108 and the communication device 102 may be terminated based on the expiry of the validity of the second unique identifier. Control passes to end step 730 with respect to the second vehicle 108.

In accordance with an embodiment of the disclosure, a system for driving assistance along a path is disclosed. The system (such as the ECU 104 (FIG. 1) may comprise one or more circuits (hereinafter referred to as the microprocessor 202 (FIG. 2). The microprocessor 202 may be configured to receive a unique identifier from the communication device 102 (FIG. 1) when the first vehicle 106 has reached a first location along a first portion of a path. The microprocessor 202 may be configured to establish a communication channel between the first vehicle 106 and the communication device 102 based on the received unique identifier. The microprocessor 202 may be configured to receive data associated with a second portion of the path from the communication device 102. The microprocessor 202 may be further configured to generate alert information associated with the second portion of the path based on the received data.

In accordance with an embodiment of the disclosure, a system for driving assistance along a path is disclosed. The system (such as the communication device 102 (FIG. 1) may comprise one or more circuits (hereinafter referred to as the processor 302 (FIG. 3). The processor 302 may be configured to determine whether the first vehicle 106 (FIG. 1) has reached a first location along a first portion of a path. The processor 302 may be configured to communicate a first unique identifier to the first vehicle 106 to establish a communication channel between the first vehicle 106 and the communication device 102. Such communication may occur when the first vehicle 106 reaches the first location along the first portion of the path. The processor 302 may be further configured to communicate data associated with a second portion of the path to the first vehicle 106.

In accordance with an embodiment of the disclosure, a vehicle for providing driving assistance along a path is disclosed. The vehicle, such as the first vehicle 106 (FIG. 2) may comprise the battery 224 and the display 210. The vehicle may further comprise an electronic control unit (such as the ECU 104 (FIG. 2) that may be powered by the battery 224. The electronic control unit may comprise one or more circuits (hereinafter referred to as the microprocessor 202 (FIG. 2) that are configured to receive a unique identifier from the communication device 102 (FIG. 1) when the vehicle has reached a first location along a first portion of a path. The microprocessor 202 may be configured to establish a communication channel between the vehicle and the communication device 102 based on the received unique identifier. The microprocessor 202 may be configured to receive data associated with a second portion of the path from the communication device 102. The microprocessor 202 may be configured to generate alert information associated with the second portion of the path based on the received data. The microprocessor 202 may be configured to display the generated alert information on the display 210.

Various embodiments of the disclosure may provide a non-transitory computer readable medium and/or storage medium, and/or a non-transitory machine readable medium and/or storage medium having stored thereon, a set of computer-executable instructions for causing a machine and/or a computer to provide driving assistance along a path. The set of computer-executable instructions in an ECU may cause the machine and/or computer to perform the steps that comprise receipt of a unique identifier at the ECU 104 of the first vehicle 106 from the communication device 102. Such receipt may occur when the first vehicle 106 has reached a first location along a first portion of a path. A communication channel may be established by the ECU 104 between the first vehicle 106 and the communication device 102. Such a communication channel may be established based on the received unique identifier. Data associated with a second portion of the path may be received by the ECU 104 from the communication device 102. Alert information associated with the second portion of the path may be generated by the ECU 104 based on the received data.

Various embodiments of the disclosure may provide a non-transitory machine/computer readable medium and/or storage medium having stored thereon, a set of computer-executable instructions for causing a machine and/or a computer to provide driving assistance along a path. The set of computer-executable instructions in a communication device (such as the communication device 102) may cause the machine and/or computer to perform the steps that comprise a determination, by the communication device 102, whether the first vehicle 106 has reached a first location along a first portion of a path. A first unique identifier may be communicated to the first vehicle 106 to establish a communication channel between the first vehicle 106 and the communication device 102. Such communication may occur when the first vehicle 106 has reached a first location along a first portion of a path. Data associated with a second portion of the path may be communicated to the first vehicle 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A driving assistance system, comprising:
    an electronic control unit of a first vehicle that drives on a path including a first portion and a second portion, wherein said electronic control unit comprises:
        a memory configured to store a set of instructions; and
        circuitry configured to:
            receive data associated with said second portion of said path from a first communication device via a communication between said first vehicle and said first communication device; and
            generate a combined view image with said second portion of said path based on said received data, wherein
                said combined view image includes at least one of an obstruction image and a vehicle image on the second portion of said path, and
                said first portion of said path includes a present position of said first vehicle and said second portion of said path excludes said present position of said first vehicle.

2. The driving assistance system according claim 1, wherein
    said combined view image includes a road image corresponding to said second portion of said path; and
    said road image is displayed to be continued to a view of said first portion of said path.

3. The driving assistance system according to claim 1, wherein said received data associated with said second portion of said path comprises road surface characteristics of said path and at least one road hazard along said path.

4. The driving assistance system according to claim 3, wherein said road surface characteristics comprise at least one of an upward slope, a downward slope, a bank angle, a curvature, a boundary, a speed limit, a road texture, a pothole, a lane marking, or a width of said second portion of said path.

5. The driving assistance system according to claim 3, wherein said at least one road hazard comprises at least one of an obstacle, an animal, a landslide, or a second vehicle present on said second portion of said path.

6. The driving assistance system according to claim 5, wherein
    said circuitry is further configured to generate alert information based on one of a current speed of said second vehicle that is higher than a threshold speed or said second vehicle that crosses a lane marking along said second portion of said path, and
    said threshold speed is determined based on said road surface characteristics of said path.

7. The driving assistance system according to claim 1, wherein said circuitry is further configured to control a display to display a generated alert information associated with said second portion of said path.

8. The driving assistance system according to claim 7, wherein
    said combined view image comprises at least one feature based on said received data, and
    said at least one feature comprises at least one of an indication of a second vehicle based on a vehicle type, a size, and a position along said second portion of said path, an indication of a current speed of said second vehicle, an indication of a current distance to pass said second vehicle, an indication of a required change in speed of said first vehicle to pass said second portion of said path, or an indication of at least one road hazard on said second portion of said path.

9. The driving assistance system according to claim 1, wherein said circuitry is further configured to receive said data associated with said second portion of said path from at least one second communication device.

10. The driving assistance system according to claim 1, further comprising a display.

11. The driving assistance system according to claim 1, further comprising a wireless communication system configured to communicate with said first communication device.

12. A method for providing driving assistance, said method comprising:
    in a vehicle driving on a path including a first portion and a second portion:
        receiving data associated with said second portion of said path from a communication device via a communication between said vehicle and said communication device; and
        generating a combined view image with said second portion of said path based on said received data, wherein
            said combined view image includes at least one of an obstruction image and a vehicle image on the second portion of said path, and
            said first portion of said path includes a present position of said vehicle and said second portion of said path excludes said present position of said vehicle.

13. A non-transitory computer-readable medium having stored thereon computer-executable instructions that, when executed by a processor, cause the processor to execute operations, the operations comprising:

receiving data associated with a second portion of a path from a communication device via a communication between a vehicle and said communication device, wherein
  said vehicle is driven on said path, and
  said path includes a first portion and said second portion; and
generating a combined view image with said second portion of said path based on said received data, wherein
  said combined view image includes at least one of an obstruction image and a vehicle image on the second portion of said path, and
  said first portion of said path includes a present position of said vehicle and said second portion of said path excludes said present position of said vehicle.

* * * * *